United States Patent
Sai

(10) Patent No.: US 10,062,038 B1
(45) Date of Patent: Aug. 28, 2018

(54) GENERATION AND USE OF TRAINED FILE CLASSIFIERS FOR MALWARE DETECTION

(71) Applicant: SparkCognition, Inc., Austin, TX (US)

(72) Inventor: Na Sai, Austin, TX (US)

(73) Assignee: SPARKCOGNITION, INC., Austin, TX (US)

(*) Notice: Subject to any disclaimer, the term of this patent is extended or adjusted under 35 U.S.C. 154(b) by 0 days.

(21) Appl. No.: 15/610,228

(22) Filed: May 31, 2017

Related U.S. Application Data

(63) Continuation of application No. 15/583,565, filed on May 1, 2017, now Pat. No. 9,864,956.

(51) Int. Cl.
| | | |
|---|---|---|
| *G06N 99/00* | (2010.01) | |
| *G06N 3/02* | (2006.01) | |
| *G06F 21/56* | (2013.01) | |

(52) U.S. Cl.
CPC ......... *G06N 99/005* (2013.01); *G06F 21/562* (2013.01); *G06N 3/02* (2013.01); *G06F 2221/033* (2013.01)

(58) Field of Classification Search
CPC ...... G06N 99/005; G06N 3/02; G06F 21/562; G06F 2221/033; G06F 21/55; H04L 29/06911; H04L 29/06925; H04L 29/06931; H04L 29/06938
See application file for complete search history.

(56) References Cited

U.S. PATENT DOCUMENTS

| | | | | |
|---|---|---|---|---|
| 5,724,593 | A * | 3/1998 | Hargrave, III | G06F 17/2827 704/7 |
| 6,006,221 | A | 12/1999 | Liddy et al. | |
| 6,144,934 | A | 11/2000 | Stockwell et al. | |
| 6,167,398 | A | 12/2000 | Wyard et al. | |
| 6,311,183 | B1 | 10/2001 | Cohen | |
| 6,578,032 | B1 | 6/2003 | Chandrasekar et al. | |
| 7,296,030 | B2 * | 11/2007 | Vo | H03M 7/30 707/693 |
| 7,305,385 | B1 | 12/2007 | Dzikiewicz et al. | |
| 7,873,947 | B1 | 1/2011 | Lakhotia et al. | |
| 8,037,535 | B2 | 10/2011 | Maloof | |

(Continued)

OTHER PUBLICATIONS

Kolter, J. et al., "Learning to Detect and Classify Malicious Executables in the Wild", Journal of Machine Learning Research, 2006, vol. 7, pp. 2721-2744.

*Primary Examiner* — Eleni A Shiferaw
*Assistant Examiner* — Shahriar Zarrineh
(74) *Attorney, Agent, or Firm* — Toler Law Group, PC

(57) ABSTRACT

A method includes accessing information identifying multiple files and identifying classification data for the multiple files, where the classification data indicates, for a particular file of the multiple files, whether the particular file includes malware. The method also includes generating a sequence of entropy indicators for each of the multiple files, each entropy indicator of the sequence of entropy indicators for the particular file corresponding to a chunk of the particular file. The method further includes generating n-gram vectors for the multiple files, where the n-gram vector for the particular file indicates occurrences of groups of entropy indicators in the sequence of entropy indicators for the particular file. The method also includes generating and storing a file classifier using the n-gram vectors and the classification data as supervised training data.

19 Claims, 11 Drawing Sheets

(56) References Cited

U.S. PATENT DOCUMENTS

| | | |
|---|---|---|
| 8,230,510 B1 | 7/2012 | Yang et al. |
| 8,233,726 B1 | 7/2012 | Popat et al. |
| 8,401,982 B1 | 3/2013 | Satish et al. |
| 8,631,330 B1 | 1/2014 | Hwang et al. |
| 8,789,172 B2 | 7/2014 | Stolfo et al. |
| 8,826,439 B1 | 9/2014 | Hu et al. |
| 9,224,067 B1 | 12/2015 | Lu et al. |
| 9,280,747 B1 | 3/2016 | Jin et al. |
| 9,292,688 B2 | 3/2016 | Avasarala et al. |
| 9,646,158 B1 * | 5/2017 | Shekokar .............. G06F 21/565 |
| 9,652,616 B1 | 5/2017 | Bhatkar et al. |
| 9,665,713 B2 | 5/2017 | Avasarala et al. |
| 9,721,097 B1 | 8/2017 | Davis et al. |
| 9,858,345 B2 | 1/2018 | Zeljkovic et al. |
| 2003/0023866 A1 | 1/2003 | Hinchliffe et al. |
| 2003/0074183 A1 | 4/2003 | Eisele |
| 2004/0073810 A1 | 4/2004 | Dettinger et al. |
| 2006/0015326 A1 | 1/2006 | Mori et al. |
| 2006/0037080 A1 | 2/2006 | Maloof |
| 2006/0100852 A1 | 5/2006 | Gamon et al. |
| 2007/0028302 A1 | 2/2007 | Brennan et al. |
| 2007/0230787 A1 | 10/2007 | Belitskaya et al. |
| 2008/0027934 A1 | 1/2008 | Duxbury |
| 2008/0120720 A1 | 5/2008 | Guo et al. |
| 2008/0184367 A1 | 7/2008 | McMillan et al. |
| 2008/0201779 A1 | 8/2008 | Tahan et al. |
| 2008/0263669 A1 | 10/2008 | Alme |
| 2009/0172815 A1 | 7/2009 | Gu et al. |
| 2009/0193293 A1 | 7/2009 | Stolfo et al. |
| 2010/0169244 A1 | 7/2010 | Zeljkovic et al. |
| 2010/0192222 A1 | 7/2010 | Stokes et al. |
| 2012/0084859 A1 | 4/2012 | Radinsky et al. |
| 2012/0155767 A1 * | 6/2012 | Zhu ..................... H04N 19/436 382/173 |
| 2012/0159620 A1 | 6/2012 | Seifert et al. |
| 2012/0159631 A1 | 6/2012 | Niemela et al. |
| 2012/0239379 A1 | 9/2012 | Gershnick |
| 2012/0260342 A1 | 10/2012 | Dube et al. |
| 2012/0317644 A1 | 12/2012 | Kumar et al. |
| 2013/0110501 A1 | 5/2013 | Saikou et al. |
| 2013/0191915 A1 | 7/2013 | Antonakakis et al. |
| 2013/0198119 A1 | 8/2013 | Eberhardt, III et al. |
| 2013/0253910 A1 | 9/2013 | Turner et al. |
| 2013/0282645 A1 | 10/2013 | Culbertson et al. |
| 2013/0326625 A1 | 12/2013 | Anderson et al. |
| 2014/0090061 A1 | 3/2014 | Avasarala et al. |
| 2014/0279763 A1 * | 9/2014 | Madnani .............. G06N 99/005 706/12 |
| 2014/0298461 A1 | 10/2014 | Hohndel et al. |
| 2015/0052601 A1 | 2/2015 | White et al. |
| 2015/0106931 A1 | 4/2015 | Mankin et al. |
| 2015/0170649 A1 | 6/2015 | Ashikawa et al. |
| 2015/0248556 A1 | 9/2015 | Sickendick et al. |
| 2016/0065534 A1 | 3/2016 | Liu et al. |
| 2016/0099967 A1 | 4/2016 | Stemm et al. |
| 2016/0127397 A1 | 5/2016 | Mekky et al. |
| 2016/0241574 A1 | 8/2016 | Kumar et al. |
| 2016/0255107 A1 | 9/2016 | Qian et al. |
| 2016/0335435 A1 | 11/2016 | Schmidtler et al. |
| 2016/0378984 A1 | 12/2016 | Wojnowicz et al. |
| 2017/0032279 A1 | 2/2017 | Miserendino et al. |
| 2017/0083825 A1 | 3/2017 | Battersby et al. |
| 2017/0085585 A1 | 3/2017 | Morkovsky |
| 2017/0111515 A1 * | 4/2017 | Bandyopadhyay ... H04M 15/41 |
| 2017/0134397 A1 | 5/2017 | Dennison et al. |
| 2017/0142140 A1 | 5/2017 | Muddu et al. |
| 2017/0208084 A1 | 7/2017 | Steelman et al. |
| 2017/0300632 A1 * | 10/2017 | Bai ...................... G06N 99/005 |
| 2018/0046938 A1 * | 2/2018 | Allen .................. G06F 17/3043 |
| 2018/0063169 A1 * | 3/2018 | Zhao .................. H04L 63/1416 |

* cited by examiner

1100

1101
Receive one or more n-gram vectors for a file as input to a file classifier, the one or more n-gram vectors indicating occurrences of groups of entropy indicators in a set of entropy indicators representing the file 1102
Generate, based on the one or more n-gram vectors, output including classification data associated with the file, the classification data indicating whether the file includes malware.

FIG. 11

GENERATION AND USE OF TRAINED FILE CLASSIFIERS FOR MALWARE DETECTION

CROSS-REFERENCE TO RELATED APPLICATIONS

The present application claims priority to and is a continuation of U.S. patent application Ser. No. 15/583,565 entitled "GENERATION AND USE OF TRAINED FILE CLASSIFIERS FOR MALWARE DETECTION," filed May 1, 2017, the contents of which are incorporated herein by reference in their entirety.

BACKGROUND

Computing devices have increasingly become targets of malicious actors through use of malware. Some types of malware, such as viruses, can cause loss of important business or personal data. Other types of malware, such as spyware, can enable malicious actors to gain access to confidential information.

Many malware detection applications use signatures (or malware definitions) to detect malware. For example, an executable file that includes malware may be processed using a hash function to generate a hash value. The hash value may act as a signature of the entire executable file or of a malware portion of the executable file. The signature may be provided to users of a malware detection application via a malware definitions update. During operation, the malware detection application compares a signature of a malware application in the malware definitions to files in memory or to received files to determine whether the files include the malware. One problem with detecting malware in this way is that new malware can be generated very quickly, potentially at a rate that is equal to or greater than distribution of new malware definitions. Accordingly, it is not unusual for a new malware or new malware-containing file to be distributed to many consumers before the consumers receive appropriate malware definitions updates to enable detection of the new malware.

SUMMARY

Particular implementations of systems for detecting malware using machine learning processes are described herein. For example, a set of malware containing files and a set of non-malware containing files may be used as training data to build a classifier (e.g., a data model configured to classify a file as malware containing or non-malware containing based on non-linear analysis of features of the file). The classifier (or "file classifier") may include a decision tree, a support vector machine, a deep neural network, or another type of trained data model (or application that executes based on a data model) to detect malware. For example, the classifier may include a data structure that describes a decision tree data model, where the decision tree data model includes one or more interior nodes, leaf nodes, and edges. In this example, the configuration of the decision tree is trained (e.g., using a gradient decent process), based on features associated with training data (e.g., the set of malware containing files, the set of non-malware containing files, and classification information associated with each file) to identify patterns in the features that correspond to malware and patterns in the features that correspond to non-malware. Subsequently, to determine whether a new file includes malware, features are extracted from the new file and provided as input to the classifier. The classifier generates a result indicating that the file likely includes malware (e.g., due to the features of the new file resembling the features of malware containing files used to train the classifier) or a result indicating that the file likely does not include malware (e.g., due to the features of the new file resembling the features of non-malware containing files used to train the classifier).

In a particular example disclosed herein, the classifier may be trained using features derived from binary files. Binary files may be executable files or files that contain executable portions in a binary form. Binary files may be processed to generate features by converting the binary files into feature data. The feature data may include a set of characters (e.g., printable characters or entropy indicators) based on the binary files, as described further below. The feature data may be used to generate one or more vectors that are provided as input (e.g., supervised training data) to train a file classifier to determine whether or not particular files contain malware.

In some implementations, the supervised training data may indicate particular types of malware associated with the malware containing files. In such implementations, the file classifier may be trained to distinguish malware containing files from non-malware containing files, and to distinguish the different types of malware within the malware containing files. For example, the file classifier may be trained to indicate that a particular file is free of malware, contains a virus, contains a worm, contains a trojan, contains spyware, contains ransomware, contains adware, etc.

One advantage of using a file classifier rather than signature data is that the file classifier may be able to identify malware that has not been specifically used to train the file classifier. For example, a trained file classifier may be able to identify files that contain so called "zero day" malware, for which no malware definition is yet available. Another advantage is that the file classifier may occupy a relatively a smaller portion of memory than a large set of malware definitions. Further, scanning a file by generating a hash of the file and comparing the hash to every hash in a set of malware definitions may take longer than providing features representing the file to the classifier and generating a classification result. Further, the file classifier can be combined with other approaches to provide more robust malware protection. For example, a hash can be generated of a new file and compared to hash values of known good (e.g., non-malware containing) files, to hash values of known bad (e.g., malware containing) files, or both, to determine whether the new file contains malware. Regardless of whether the comparison of hash values indicates that the new file contains malware, features may be extracted from the new file and provided to the file classifier to generate a classification result indicating whether the new file contains malware. Accordingly, in this example, the file classifier-based process and the signature-based process provide complementary and substantially independent layers of malware detection, which may improve the likelihood of detecting malware containing files.

In a particular aspect, a computing device includes a memory configured to store instructions to execute a file classifier and a processor configured to execute the instructions from the memory. Execution of the instructions causes the processor to perform operations including receiving one or more n-gram vectors for a file as input to the file classifier, where the one or more n-gram vectors indicate occurrences of character pairs in printable characters representing the file. The operations also include generating, by the file classifier, output including classification data associated with the file based on the one or more n-gram vectors, where the classification data indicates whether the file includes malware.

In another particular aspect, a method includes receiving one or more n-gram vectors for a file as input to a file classifier, where the one or more n-gram vectors indicate occurrences of character pairs in printable characters representing the file. The method also includes generating, by the file classifier, output including classification data associated with the file based on the one or more n-gram vectors, where the classification data indicates whether the file includes malware.

In another particular aspect, a computer-readable storage device stores instructions that, when executed, cause a computer to perform operations including receiving one or more n-gram vectors for a file as input to a file classifier, where the one or more n-gram vectors indicate occurrences of character pairs in printable characters representing the file. The operations also include generating, by the file classifier, output including classification data associated with the file based on the one or more n-gram vectors, where the classification data indicates whether the file includes malware.

In a particular aspect, a computing device includes a memory configured to store instructions to execute a file classifier and a processor configured to execute the instructions from the memory. Execution of the instructions causes the processor to perform operations including accessing information identifying multiple files and identifying classification data for the multiple files, where the classification data indicates, for a particular file of the multiple files, whether the particular file includes malware. The operations also include generating n-gram vectors for the multiple files by, for each file, generating an n-gram vector indicating occurrences of character pairs in printable characters representing the file. The operations further include generating and storing a file classifier using the n-gram vectors and the classification data as supervised training data.

In another particular aspect, a method includes accessing information identifying multiple files and identifying classification data for the multiple files, where the classification data indicates, for a particular file of the multiple files, whether the particular file includes malware. The method also includes generating n-gram vectors for the multiple files by, for each file, generating an n-gram vector indicating occurrences of character pairs in printable characters representing the file. The method further includes generating and storing a file classifier using the n-gram vectors and the classification data as supervised training data.

In another particular aspect, a computer-readable storage device stores instructions that, when executed, cause a computer to perform operations including accessing information identifying multiple files and identifying classification data for the multiple files, where the classification data indicates, for a particular file of the multiple files, whether the particular file includes malware. The operations also include generating n-gram vectors for the multiple files by, for each file, generating an n-gram vector indicating occurrences of character pairs in printable characters representing the file. The operations further include generating and storing a file classifier using the n-gram vectors and the classification data as supervised training data.

In another particular aspect, a computing device includes a memory configured to store instructions to execute a file classifier and a processor configured to execute the instructions from the memory. Execution of the instructions causes the processor to perform operations including receiving one or more n-gram vectors for a file as input to a file classifier, where the one or more n-gram vectors indicate occurrences of groups of entropy indicators in a sequence of entropy indicators representing the file. The operations also include generating, based on the one or more n-gram vectors, output including classification data associated with the file, the classification data indicating whether the file includes malware.

In another particular aspect, a method includes receiving one or more n-gram vectors for a file as input to a file classifier, where the one or more n-gram vectors indicate occurrences of groups of entropy indicators in a sequence of entropy indicators representing the file. The method also includes generating, based on the one or more n-gram vectors, output including classification data associated with the file, the classification data indicating whether the file includes malware.

In another particular aspect, a computer-readable storage device stores instructions that, when executed, cause a computer to perform operations including receiving one or more n-gram vectors for a file as input to a file classifier, where the one or more n-gram vectors indicate occurrences of groups of entropy indicators in a sequence of entropy indicators representing the file. The operations also include generating, based on the one or more n-gram vectors, output including classification data associated with the file, the classification data indicating whether the file includes malware.

In another particular aspect, a computing device includes a memory configured to store instructions to execute a file classifier and a processor configured to execute the instructions from the memory. Execution of the instructions causes the processor to perform operations including accessing information identifying multiple files and identifying classification data for the multiple files, where the classification data indicates, for a particular file of the multiple files, whether the particular file includes malware. The operations also include generating a sequence of entropy indicators for each of the multiple files, each entropy indicator of the sequence of entropy indicators for the particular file corresponding to a chunk of the particular file. The operations further include generating n-gram vectors for the multiple files, where the n-gram vector for the particular file indicates occurrences of groups of entropy indicators in the sequence of entropy indicators for the particular file. The operations also include generating and storing a file classifier using the n-gram vectors and the classification data as supervised training data.

In another particular aspect, a method includes accessing information identifying multiple files and identifying classification data for the multiple files, where the classification data indicates, for a particular file of the multiple files, whether the particular file includes malware. The method also includes generating a sequence of entropy indicators for each of the multiple files, each entropy indicator of the sequence of entropy indicators for the particular file corresponding to a chunk of the particular file. The method further includes generating n-gram vectors for the multiple files, where the n-gram vector for the particular file indicates occurrences of groups of entropy indicators in the sequence of entropy indicators for the particular file. The method also includes generating and storing a file classifier using the n-gram vectors and the classification data as supervised training data.

In another particular aspect, a computer-readable storage device stores instructions that, when executed, cause a computer to perform operations including accessing information identifying multiple files and identifying classification data for the multiple files, where the classification data indicates, for a particular file of the multiple files, whether the particular file includes malware. The operations also include generating a sequence of entropy indicators for each of the multiple files, each entropy indicator of the sequence of entropy indicators for the particular file corresponding to a chunk of the particular file. The operations further include generating n-gram vectors for the multiple files, where the n-gram vector for the particular file indicates occurrences of groups of entropy indicators in the sequence of entropy indicators for the particular file. The operations also include generating and storing a file classifier using the n-gram vectors and the classification data as supervised training data.

BRIEF DESCRIPTION OF THE DRAWINGS

FIG. 11 is a flowchart illustrating another particular example of a method of using a trained file classifier.

DETAILED DESCRIPTION

Figure 1:
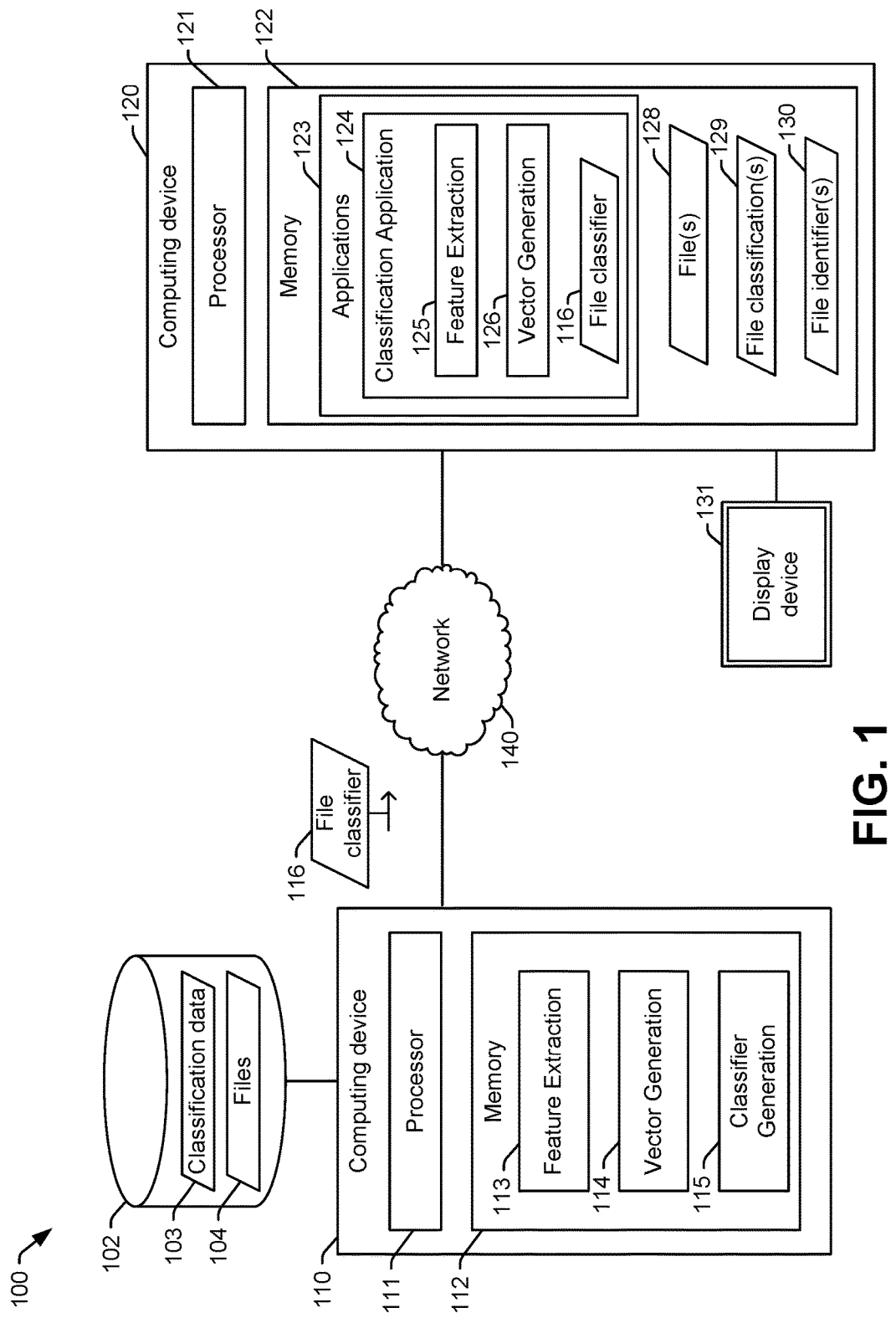
FIG. 1 illustrates a first example of a system that is operable to generate and use a trained file classifier for malware detection.

FIG. 1 illustrates a first example of a system 100 that is operable to generate and use a trained file classifier for malware detection. The system 100 includes a first computing device 110 configured to generate file classifiers and a second computing device 120 configured to use a file classifier to determine whether or not a particular file includes malware. Although illustrated as two distinct computing devices in FIG. 1, in some implementations, the first computing device 110 may include the second computing device 120. For example, the first computing device 110 may be configured to both generate and use the file classifier.

In FIG. 1, the first computing device 110 includes a processor 111 and a memory 112. The memory 112 stores instructions executable by the processor 111 to generate a file classifier 116. For example, the memory 112 may store an automated model building application or an application that is executable to access training data, generate a data model based on training data 102, and output data corresponding to the data model as the file classifier. As used herein, a "file classifier" refers to a data model or a set of parameters that characterize a data model, where the data model is generated via a machine learning technique, such as by iterative modification of parameters based on supervised training data. As such, the file classifier disclosed herein may also be referred as a "trained file classifier" to denote that the file classifier is generated, based on supervised training data, using a machine learning technique.

The training data 102 may include a plurality of files 104 and classification data 103 associated with each of the files 104. The classification data 103 for a particular file indicates whether or not the particular file includes malware. Alternately, or in addition, if the particular file includes malware, the classification data 103 may indicate a particular type of malware (e.g., a trojan, a worm, spyware, adware, etc.) contained by the particular file.

In FIG. 1, the instructions executable by the processor 111 to generate the file classifier 116 based on the training data 102 include feature extraction instructions 113, vector generation instructions 114, and classifier generation instructions 115. As described further below, the feature extraction instructions 113 are executable to extract features from one or more of the files 104 and to provide the features to the vector generation instructions 114. Examples of features that may be extracted by the feature extraction instructions 113 include a string (or set of characters) representing binary content of a particular file of the files 104. Another example of features that may be extracted by the feature extraction instructions 113 includes entropy indicators representing binary content of a particular file of the files 104.

The vector generation instructions 114 are executable by the processor 111 to generate a feature vector based on features extracted by the feature extraction instructions 113. The feature vector, in combination with a corresponding portion of the classification data 103, is used as supervised training data to generate and test the file classifier. For example, supervised training data for a particular file may include one or more feature vectors (e.g., vectors of feature n-grams, as described further below) and classification information associated with the particular file.

The classifier generation instructions 115 uses a machine learning technique (e.g., an iterative model building process) to build a data model of a portion of the training data 102. The data model is iteratively trained, e.g., using a gradient decent process, to reduce or minimize an error between a classification output by the data model for a particular file and a classification assigned to the particular file in the classification data 103. After a training criterion is satisfied (e.g., after a particular number of iteration, or after additional iterations cease to reduce the error), a second portion of the training data 102 is used to test the data model. During testing of the data model, a file from the training data 102 that was not used to generate the data model is processed to generate a feature vector as input to the data model. A classification of the file assigned by the data model is compared to classification data associated with the file to determine whether the data model correctly classified the file. After multiple tests, if the data model performs adequately (e.g., the data model correctly classifies a threshold portion of tested files) data representing the data model may be output as a file classifier 116. If the data model does not perform adequately (e.g., the data model incorrectly classifies a threshold portion of tested files) additional training iterations may be performed.

After the first computing device 110 generates the file classifier 116, the file classifier 116 may be provided (e.g., via a network 140) to the second computing device 120 for use in detecting malware. For example, the second computing device 120 may receive a file 128 from another computing device (not shown) or may access the file 128 from a memory 122 of the second computing device 120. The second computing device 120 may process the file 128 using a classification application 124, as described further below, to determine whether the file 128 contains malware. The second computing device 120 may include a smart phone, a mobile communication device, a portable computer, a stationary (e.g., desktop or rack-mounted) computer, a tablet, a personal digital assistant (PDA), a set top box device, a video player, an entertainment unit, a display device, a television, a gaming console, a music player, a radio, a camera, a navigation device, an on-board component of a vehicle, an "internet-of-things" device (such as a smart home controller or sensor), or a combination thereof. Further, although only one second computing device 120 is illustrated in FIG. 1, in other implementations, the first computing device 110 may distribute the file classifier 116 to many other computing devices. For example, each of the other computing devices may include an instance of the classification application 124 and the file classifier 116. In this example, the file classifier 116 may be updated occasionally, and a new version of the file classifier 116 may be provided to the other computer device, e.g., as part of a malware detection update service.

Figure 2:
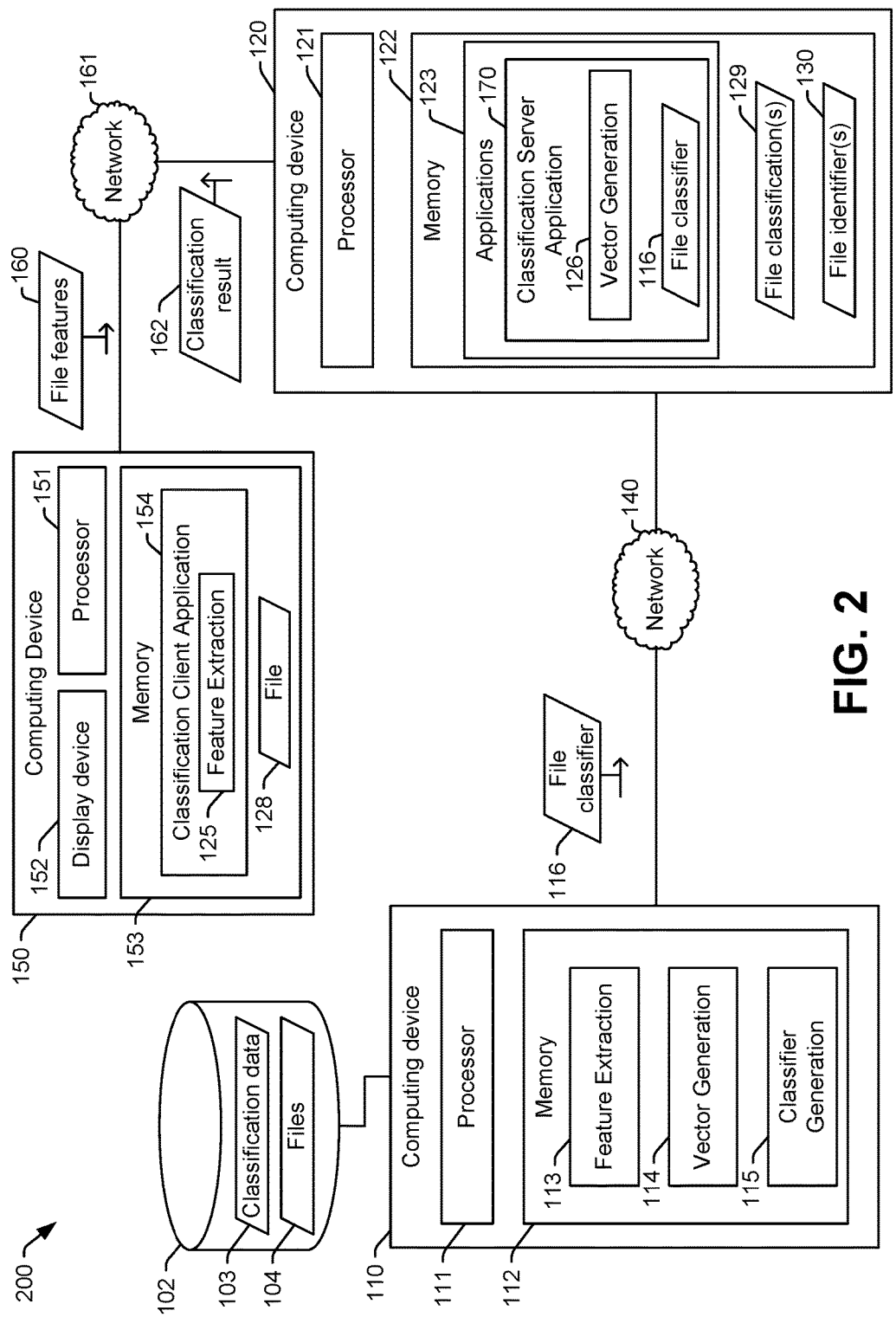
FIG. 2 illustrates a second example of a system that is operable to generate and use a trained file classifier for malware detection.

The second computing device 120 may include the memory 122 and processor 121. The processor 121 may be configured to execute instructions from the memory 122 to perform various operations. For example, the memory 122 may include one or more applications 123, such as a browser application, a word processing application, an e-mail application, and so forth. The applications 123 may also include an operating system and associated utility applications, such as a file browser. In FIG. 2, the applications 123 also include the classification application 124.

The classification application 124 may be configured to utilize the file classifier 116 as a data model to scan the file 128 to determine whether the file 128 includes malware. For example, the classification application 124 includes the feature extraction instructions 125, which are executable to extract features from the file 128. In a particular implementation, the feature extraction instructions 125 perform operations similar to the operations performed by the feature extraction instructions 113. For example, if the feature extraction instructions 113 generate file features by extracting printable characters, then the feature extraction instructions 125 also generate file features by extracting printable characters. As another example, if the feature extraction instructions 113 generate file features by generating entropy indicators, then the feature extraction instructions 125 also generate file features by extracting entropy indicators. As yet another example, if the feature extraction instructions 113 generate file features by extracting printable characters and entropy indicators, then the feature extraction instructions 125 also generate file features by extracting printable characters and entropy indicators.

The classification application 124 also includes the vector generation instructions 126, which are executable to generate a feature vector or feature vectors based on the features of the file 128 provided by the feature extraction instructions 125. In a particular implementation, the vector generation instructions 126 perform operations similar to the operations performed by the vector generation instructions 114. For example, if the vector generation instructions 114 generate multiple n-gram feature vectors (as describe further below), then the vector generation instructions 126 also generate multiple n-gram feature vectors.

The feature vector or feature vectors generated by the vector generation instructions 126 are provided as input to the file classifier 116. The file classifier 116 generates a classification result indicating whether or not the file 128 includes malware. An example of use of the file classifier 116 by the classification application 124 is described with reference to FIG. 6.

The processor 121 may store information indicating the classification result at the memory 122. For example, a file identifier 130 of the file 128 and the classification result of the file 128 may be stored as file classification data 129. In some implementations, the file identifier 130 of the file 128 may include or correspond to a hash value based on the file 128. For example, the file identifier 130 may include a hash value of the feature vector or feature vectors of the file 128. In such implementations, the file identifier 130 and file classification data 129 may be retained in the memory 122 as a whitelist or blacklist. For example, when a new file, not shown, is received at the second computing device 120, the feature extraction instructions 125 may extract file features from the new file, and the vector generation instructions 126 may generate feature vectors of the new file. The classification application 124 may generate a hash value based on the feature vectors of the new file, and the hash value of the feature vectors of the new file may be compared to file identifiers 130 in the memory 122 to determine whether the new file has been classified by the file classifier 116. If the new file has already been classified by the file classifier 116, the processor 121 may forego classification of the new file using the file classifier 116. However, if the new file was classified using a prior file classifier (or a prior version of the file classifier 116), the processor 121 provide the feature vectors of the new file to the file classifier 116 to determine whether the file classifier 116 detects malware that was undetected by the prior file classifier or fails to detect malware that was detected by the prior file classifier.

In certain implementations, the classification application 124 may be configured to provide an output to a display device 131. For example, when the file 128 contains malware, the classification application 124 may provide an alert via the display device 131 to notify a user that the file 128 is unsafe.

FIG. 2 illustrates a second example of a system 200 that is operable to generate and use a trained file classifier for malware detection. The system 200 includes a first computing device 110 configured to generate a file classifier, a second computing device 120 configured to use the file classifier to determine whether or not a particular file includes malware, and a third computing device 150 configured to send file features of a file to be analyzed using the file classifier to the second computing device 120. Although the first computing device 110 and the second computing device 120 are illustrated as two distinct computing devices in FIG. 2, in some implementations, the first computing device 110 may include the second computing device 120. For example, the first computing device 110 may be configured to both generate and use the file classifier. Further, although only one second computing device 120 is illustrated in FIG. 2, in other implementations, the first computing device 110 may distribute the file classifier 116 to many other computing devices, such as server computing devices or client computing devices.

The first computing device 110 of FIG. 2 is includes the same features as and operates in the same manner as the first computing device 110 of FIG. 1. However, in FIG. 2, functions associated with the classification application 124 of FIG. 1 are divided between the second computing device 120 and the third computing device 150. For example, the second computing device 120 includes a classification server application 170, and the third computing device 150 includes a classification client application 154. The third computing device 150 may include a smart phone, a mobile communication device, a portable computer, a stationary (e.g., desktop or rack-mounted) computer, a tablet, a personal digital assistant (PDA), a set top box device, a video player, an entertainment unit, a display device, a television, a gaming console, a music player, a radio, a camera, a navigation device, an on-board component of a vehicle, an "internet-of-things" device (such as a smart home controller or sensor), or a combination thereof. In a particular aspect, the third computing device 150 may be relatively resource constrained. For example, a processor 151 of the third computing device 150 may have less processing capability than the processor 121 of the second computing device 120. As another example, the third computing device 150 may be portable, and may therefore have a portable power supply, such as a battery. To avoid straining the resources of the third computing device 150, the third computing device 150 may offload some processing, such as file classification, to the second computing device 120, as described further below.

The third computing device 150 may include a memory 153 and the processor 151. The processor 151 may be configured to execute instructions from the memory 153 to perform variously operations. For example, the memory 153 may include one or more applications, such as a browser application, a word processing application, an e-mail application, and so forth. The memory 153 may also include an operating system and associated utility applications, such as a file browser. In FIG. 2, the memory 153 also include the classification client application 154.

The classification client application 154 may be configured to send data characteristic of a file 128 to the second computing device 120 via a network 161. For example, the classification client application 154 may include the feature extraction instructions 125. In a particular implementation, the feature extraction instructions 125 perform operations similar to the operations performed by the feature extraction instructions 113. For example, if the feature extraction instructions 113 generate file features by extracting printable characters, then the feature extraction instructions 125 also generate file features by extracting printable characters. As another example, if the feature extraction instructions 113 generate file features by generating entropy indicators, then the feature extraction instructions 125 also generate file features by extracting entropy indicators. As yet another example, if the feature extraction instructions 113 generate file features by extracting printable characters and entropy indicators, then the feature extraction instructions 125 also generate file features by extracting printable characters and entropy indicators.

In a particular implementation, to determine whether the file 128 includes malware, the feature extraction instructions 125 generate file features 160 based on the file 128, and the classification client application 154 sends the file features 160 to the second computing device 120. For example, the file features 160 may include a string of printable characters extracted from the file 128. As another example, the file features 160 may include entropy indicators determined based on the file 128. In some implementations, the classification client application 154 may also include vector generation instructions (such as the vector generation instructions 126 of the second computing device 120). In such examples, the file features 160 may include or correspond to vectors determined based on the features extracted by the feature extraction instructions 125.

The second computing device 120 may provide the file features 160 to the classification server application 170. In the example illustrated in FIG. 2, the classification server application 170 includes the vector generation instructions 126. The vector generation instructions 126 are executable to generate a feature vector or feature vectors based on the file features 160. In a particular implementation, the vector generation instructions 126 perform operations similar to the operations performed by the vector generation instructions 114. For example, if the vector generation instructions 114 generate multiple n-gram feature vectors (as describe further below), then the vector generation instructions 126 also generate multiple n-gram feature vectors. In implementations in which the third computing device 150 includes the vector generation instructions 126, the classification server application 170 may omit (e.g., not include) the vector generation instructions 126.

The classification server application 170 provides the feature vector or feature vectors to the file classifier 116. The file classifier 116 generates a classification result 162 indicating whether or not the file 128 includes malware. The second computing device 120 sends data indicating the classification result 162 to the third computing device 150 via the network 161.

The second computing device 120, the third computing device 150, or both, may store the classification result at a corresponding memory 122, 153. For example, the processor 121 may store a file identifier 130 of the file 128 and the classification result 160 as file classification data 129. As explained above, the file identifier 130 of the file 128 may include or correspond to a hash value based on the file 128, such as a hash value of the feature vector or feature vectors of the file 128. The file identifier 130 and file classification data 129 may be retained in the memory 122, in the memory 153, or both, as a whitelist or blacklist.

In certain implementations, the classification client application 154 may be configured to provide an output to a display device 152 of the third computing device 150. For example, when the file 128 contains malware, the classification client application 154 may provide an alert via the display device 152 to notify a user that the file 128 is unsafe.

Figure 3:
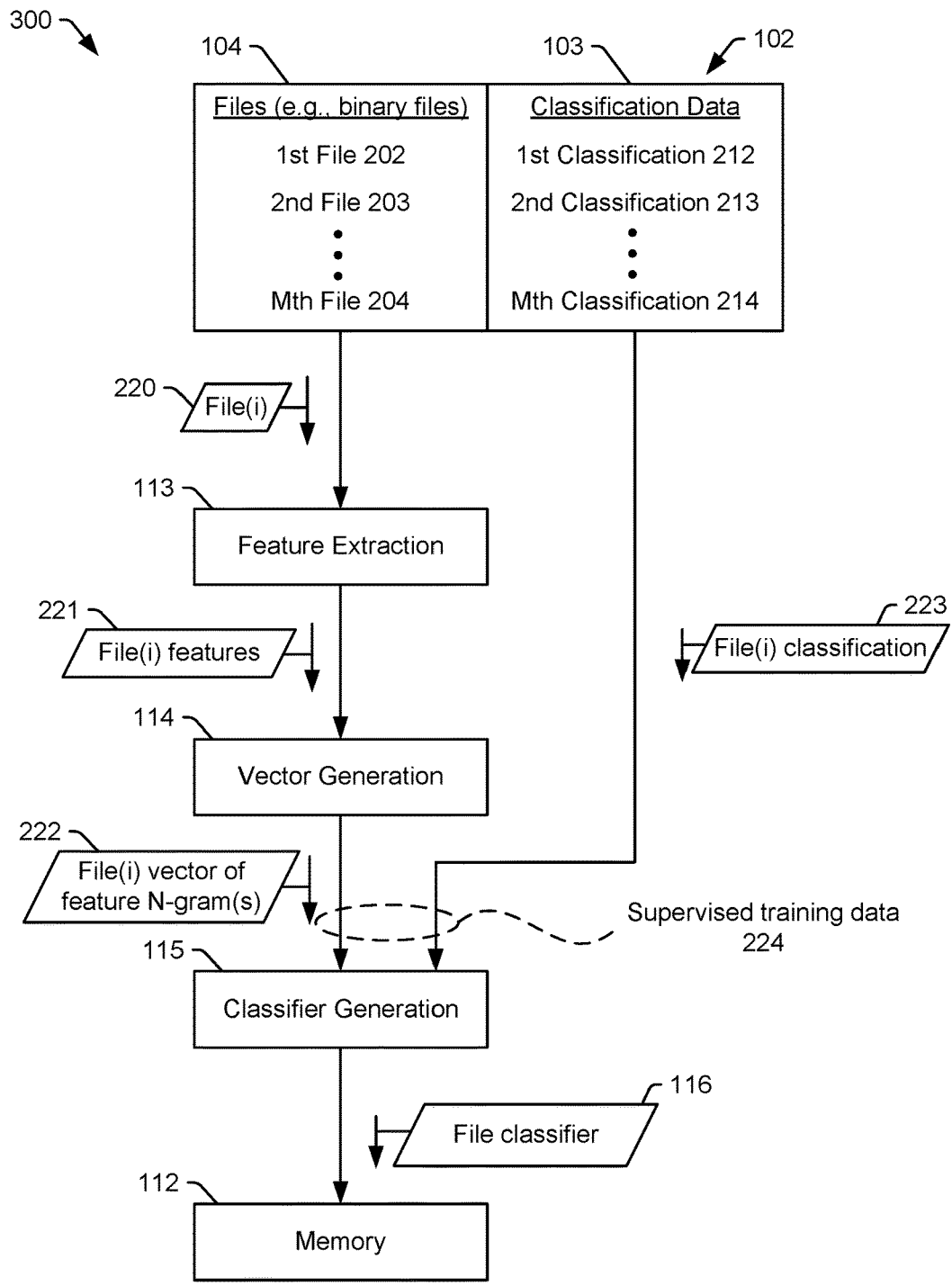
FIG. 3 illustrates a particular example of a process of generating a trained file classifier for malware detection.

FIG. 3 illustrates a particular example of a process 300 of generating a trained file classifier for malware detection. In FIG. 3, the files 104 of the training data 102 include a first file 202, a second file 203, and one or more additional files including an Mth file 204. The classification data 103 includes a classification associated with each of the files 104. For example, a first classification 212 is associated with the first file 202, a second classification 213 is associated with the second file 203, and an Mth classification 214 is associated with the Mth file 204.

Figure 4:
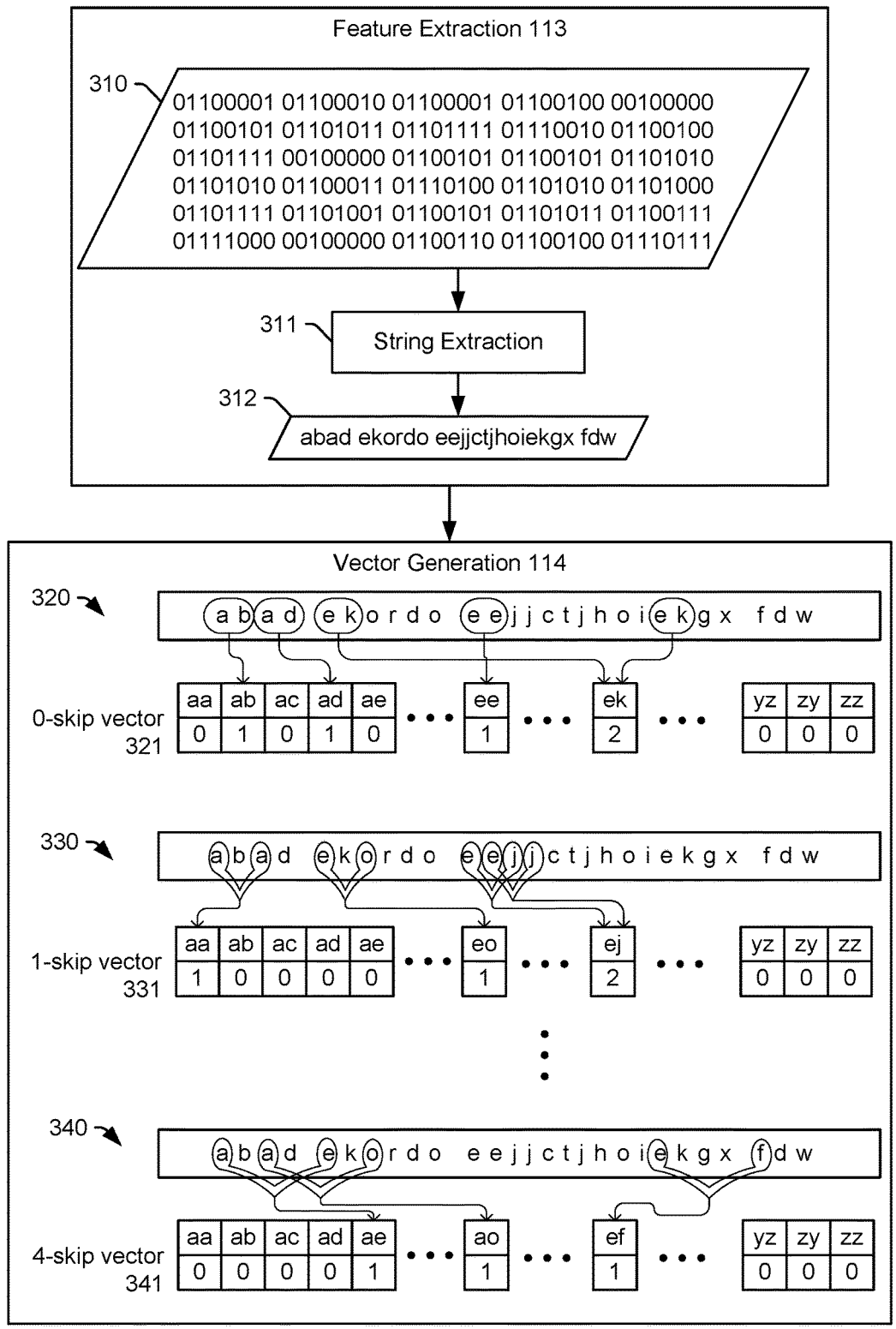
FIG. 4 illustrates a first particular example of feature extraction and vector generation to generate or use a trained file classifier for malware detection.

To generate the file classifier 116, one or more of the files 104 is provided to the feature extraction instructions 113. For example, as illustrated in FIG. 3, a file 220 is provided to the feature extraction instructions 113 to generate file features 221. The file features 221 may include a set of characters (e.g., a string) representing binary values of the file 220. For example, as describe with reference to FIG. 4, the file 220 may be a binary file, and the feature extraction instructions 113 may convert the binary file into a set of alphanumeric characters, American Standard Code for Information Interchange (ASCII) characters, or Unicode characters. To illustrate, the feature extraction instructions 113 may performing a binary-to-ASCII conversion, using a utility such as the UNIX strings utility. In some examples, only particular characters or sets of characters are used to form the file features 221. To illustrate, the file features 221 may include only printable characters generated by the binary-to-ASCII conversion or only a subset of the printable characters generated by the binary-to-ASCII conversion (such as only lowercase letters and spaces, as illustrated in FIG. 4). Additionally or in the alternative, the file features 221 may omit groups of characters that are shorter than a threshold length, such as set of characters including fewer than four characters.

Figure 5:
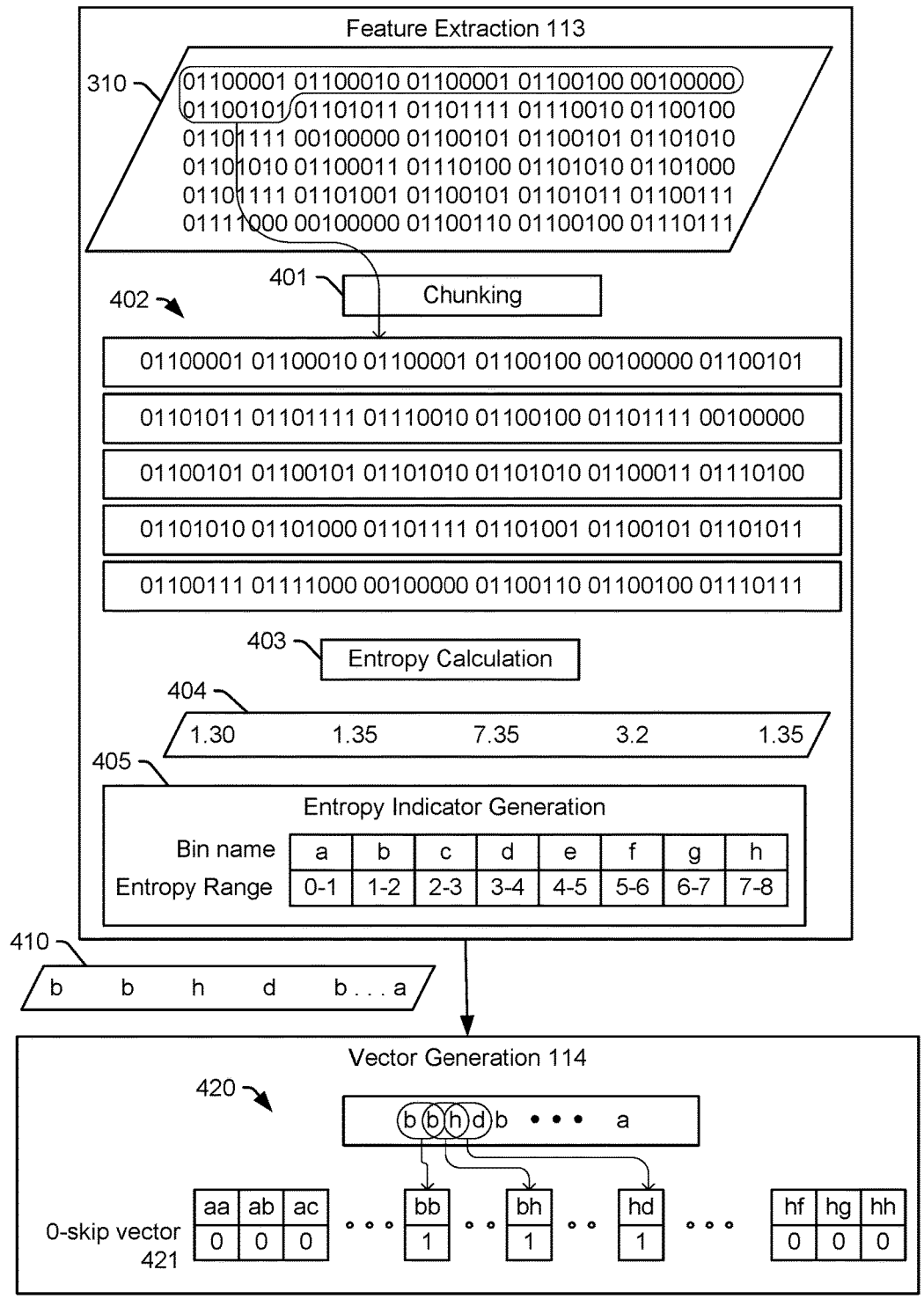
FIG. 5 illustrates a second particular example of feature extraction and vector generation to generate or use a trained file classifier for malware detection.

Instead of or in addition to converting the file 220 into a set of alphanumeric characters, the feature extraction instructions 113 may generate the file features 221 based on entropy information associated with the particular file 220, as describe further with reference to FIG. 5. For example, the file 220 may include a binary file, and the feature extraction instructions 113 may generate an entropy value for each block of a particular size of the particular file 220. The entropy values may be used to generate entropy indicators represented by, for example, alphanumeric characters. In this example, the file features 221 provided to the vector generation instructions 114 include the entropy indicators.

In some examples, the feature extraction instructions 113 perform both string extraction and entropy indicator extraction. In such examples, the file features 221 include the entropy indicators and sets of characters (e.g., printable ASCII characters).

The vector generation instructions 114 are configured to generate a vector representing n-grams of the file features 221. In this context, an n-gram refers to sequence of n values in the file features 221, where n is a positive integer greater than or equal to two. In some implementations, as describe further below, the vector generation instructions 114 may generate more than one vector based on the file features 221 of the file 220. In such implementations, the n-grams used to generate the vectors may include contiguous sequences of values (i.e., zero-skip grams), discontinuous sequences of values (i.e., skip grams), or both.

For example, as described in the example of FIG. 4, the file features 221 may include printable characters representing the binary values of the file 220, and the file vector 222 may include values representing occurrence of n-grams (e.g., pairs when n=2, triplets when n=3, etc.) of printable characters of the file features 221. The n-grams may represent adjacent printable characters within the file features 221. Additionally, or in the alternative, the file vector 222 may represent nonadjacent characters from the file features 221. To illustrate, for a bi-gram (e.g., n=2), a pair of nonadjacent characters of the file features 221 may include characters that are separated by at least one other character (e.g., a one-skip gram), at least two other characters (e.g., a two-skip gram), at least three other characters (e.g., a three-skip gram), at least four other characters (e.g., a four-skip gram), etc. In another example, the file vectors 222 may include n-grams of more than two characters, such as a three character n-gram (e.g., n=3).

In a particular implementation, the file vector 222 includes values representing occurrence of n-grams (e.g., pairs of characters, groups of characters, pairs of entropy indicators, or groups of entropy indicators) in the file features 221. For example, as illustrated in greater detail in FIG. 4, a particular file vector may indicate occurrence of zero-skip, bi-grams in the file features 221. In this example, the particular file vector include one field for each possible bi-gram (based on characters that are permitted to be included in the file features 221). To illustrate, if the feature extraction instructions 113 generate the file features 221 such that the file features 221 include only lowercase English letters and spaces, then there are 27 distinct characters permitted in the file features 221 (corresponding to a-z and a space character). Each bi-gram may include any of the 27 permitted characters as a first character and any of the 27 permitted characters as a second character. Thus, there are 27×27 (or 729) possible bi-grams based on the characters permitted in the file features 221. In this example, each file vector may include 729 fields, each field indicate occurrence of a corresponding bi-gram.

In a particular implementation, the file vector 222 is a Boolean vector (i.e., a vector of Boolean values). In this particular implementation, a value in each field is either a one (1) indicating that the n-gram appears in the file features 221 at least once or is a zero (0) indicating that the n-gram does not appear in the file features 221. In another particular implementation, each field of the file vector 222 represents a count of occurrences of the corresponding n-gram. In this particular implementation, the value in a particular field is a zero (0) indicating that the n-gram does not appear in the file features 221, or is an integer indicating the number of times that the n-gram appears in the file features 221.

In some implementations, the vector generation instructions 114 generate more than one file vector for each file. For example, the vector generation instructions 114 may generate a file vector based on adjacent characters (e.g., zero-skip n-grams) of the file features 221 and may generate one or more other file vectors based on non-adjacent characters (e.g., skip n-grams) of the file features 221. To illustrate, the vector generation instructions 114 may generate a first file vector based on zero-skip bi-grams (e.g., adjacent pairs of characters) of the file features 221, may generate a second file vector based on one-skip bi-grams (e.g., pairs of characters with one intervening character) of the file features 221, may generate a third file vector based on two-skip bi-grams (e.g., pairs of characters with two intervening character) of the file features 221, may generate a fourth file vector based on three-skip bi-grams (e.g., pairs of characters with three intervening character) of the file features 221, and may generate a fifth file vector based on four-skip bi-grams (e.g., pairs of characters with four intervening character) of the file features 221. In this example, the first, second, third, fourth, and fifth file vectors may be concatenated to form the file vector 222 provided with the file classification 223 of the file 220 as part of the supervised training data 224. In other examples, more than or fewer than five file vectors based on different skip grams may be used. Additionally or in the alternative, one or more file vectors based on n-grams of entropy indicators may be combined with (e.g., concatenated with) one or more file vectors based on n-grams of printable characters as part of the supervised training data 224.

The classifier generation instructions 115 use the supervised training data 224 to generate the file classifier 116. For example, the classifier generation instructions 115 may utilize an automated neural network building process, a support vector machine building process, a gradient descent boosting decision tree building process, or another process to build the file classifier 116 using a machine learning technique. The file classifier 116 (or data describing the file classifier 116) may be stored at the memory 112. Additionally, the file classifier 116 may be provided to other computing devices, such as the second computing device 120 of FIG. 1, the second computing device 120 of FIG. 2, or both.

FIG. 4 illustrates a first particular example of operations performed by the feature extraction instructions 113 and the vector generation instructions 114. In particular, FIG. 4 illustrates generating file features by converting a binary file 310 into a set of characters, and generating multiple file vectors based on n-grams of the file features. As explained with reference to FIGS. 1 and 2, the feature extraction instructions 125 and the vector generation instructions 126 may perform the same operations as the feature extraction instructions 113 and the vector generation instructions 114 on a file to be classified.

In FIG. 4, the feature extraction instructions 113 receive the binary file 310. The binary file 310 may include an executable file, such as one of the files 104 of FIG. 1-3. The feature extraction instructions 113 include string extraction instructions 311. The string extraction instructions 311 are configured to determine a set of characters 312 based on the binary file 310. For example, the string extraction instructions 311 may include or correspond to a UNIX strings utility, and the set of characters 312 may include ASCII characters represented by portions of the binary file. In a particular implementation, only a subset of ASCII characters are allowed in the set of characters 312. For example, the string extraction instructions 311 may generate only lowercase English letters, only uppercase English letters, only letters and numbers, or only printable ASCII characters. In the particular example illustrated in FIG. 4, the set of characters 312 includes only lowercase English letters and spaces represented by the binary file 310. Thus, in the example illustrated in FIG. 4, the set of characters 312 is a string of printable characters.

The feature extraction instructions 113 may provide the set of characters 312 to the vector generation instructions 114. In the particular example illustrated in FIG. 4, the vector generation instructions 114 illustrate generation of a first vector based on zero-skip bi-grams, generation of a second vector based on one-skip bi-grams, and generation of a third vector based on four-skip bi-grams. In other implementations, similar processes may be used to generate vectors based on bi-grams with different skip values (e.g., a two-skip bi-gram), vectors based on n-grams with a different value of n (e.g., tri-grams, where n=3), or a combination thereof (e.g., a vector based on a zero-skip tri-gram, a vector based on a one-skip tri-gram, etc.).

A first operation 320 illustrate forming a first vector (e.g., zero-skip vector 321) based on zero-skip bi-grams of the set of characters 312. Because the zero-skip vector 321 is based on zero-skip grams, each value of the zero-skip vector 321 represents a contiguous or adjacent group of characters. Further, since the zero-skip vector 321 is based on bi-grams, each of the contiguous or adjacent group of characters includes two characters. Thus, each value of the zero-skip vector 321 represents occurrence of a particular pair of adjacent characters in the set of characters 312. In particular, in FIG. 4, each zero value of the zero-skip vector 321 indicates that a corresponding pair of adjacent characters does not occur in the set of characters 312. To illustrate, a value of zero in a first field (corresponding to the bi-gram "aa") of the zero-skip vector 321 indicates that no character "a" is adjacent to another character "a" in the set of characters 312. Also in FIG. 4, each non-zero value of the zero-skip vector 321 indicates that a corresponding pair of adjacent characters does occur in the set of characters 312. To illustrate, a value of one in a second field (corresponding to the bi-gram "ab") of the zero-skip vector 321 indicates that at least one character "a" is adjacent to (e.g., immediately precedes) a character "b" in the set of characters 312. In the particular implementation illustrated in FIG. 4, each field of the zero-skip vector 321 represents a count of occurrences of the corresponding bi-gram. Thus, in this implementation, the value of one in the second field (corresponding to the bi-gram "ab") of the zero-skip vector 321, indicates that the bi-gram "ab" occurs once in the set of characters. Similarly, in this implementation, the value of two in the field corresponding to the bi-gram "ek" indicates that the bi-gram "ek" occurs twice in the set of characters. In other implementations, the vector generation instructions 114 generate Boolean vectors. In such implementations, the value of each field is either a zero indicating that the corresponding bi-gram does not occur in the set of characters 312, or is a one indicating that the corresponding bi-gram occur at least once in the set of characters 312.

The zero-skip vector 321 has a length (e.g., a number of fields) corresponding to a number of possible bi-grams that could occur in the set of characters 312. Stated another way, the length of the zero-skip vector 321 is equal to P×P, where P is a count of distinct characters that the string extraction instructions 311 are allowed to generate. To illustrate, as explained above, in the example illustrated in FIG. 4, the string extraction instructions 311 are configured to extract only lowercase English letters and spaces. Accordingly, the count of distinct characters that the string extraction instructions 311 are allowed to generate equals 27, so P×P equals 27×27 or 729. Thus, in this example, the zero-skip vector 321 has a length of 729 fields, with each field corresponding to a particular bi-gram, and the entire set of 729 fields representing every possible bi-gram based on the distinct characters generated by the string extraction instructions 311. If the string extraction instructions 311 are allowed to extract more distinct characters, then the zero-skip vector 321 will be longer. For example, if the string extraction instructions 311 are allowed to extract as lower case English letters (26 distinct characters), numbers (10 distinct characters), and spaces (1 distinct character), then P=26+10+1, or 37 and P×P=37×37, or 1369 fields.

A second operation 330 of FIG. 4 illustrates forming a second vector (e.g., one-skip vector 331) based on one-skip bi-grams of the set of characters 312. Because the one-skip vector 331 is based on one-skip grams, each value of the one-skip vector 331 represents a non-adjacent group of characters (e.g., two characters with one character between them). Further, since the one-skip vector 331 is based on bi-grams, each non-adjacent group of characters includes two characters. Thus, each value of the one-skip vector 331 represents occurrence of a particular pair of characters separated in the set of characters 312 by one other character. In FIG. 4, each zero value of the one-skip vector 331 indicates that a corresponding pair of characters separated by one other character does not occur in the set of characters 312. To illustrate, a value of zero in a second field (corresponding to the bi-gram "ab") of the one-skip vector 331 indicates that within the set of characters 312, no character "a" is separated from a character "b" by one intervening character. Also in FIG. 4, each non-zero value of the zero-skip vector 321 indicates that a corresponding pair of characters does occur in the set of characters 312 with one intervening character. To illustrate, a value of one in a first field (corresponding to the bi-gram "aa") of the one-skip vector 331 indicates that at least one character "a" precedes a character "a" in the set of characters 312 with one character between them. In the particular implementation illustrated in FIG. 4, each field of the one-skip vector 331 represents a count of occurrences of the corresponding bi-gram. Thus, in this implementation, the value of one in the first field (corresponding to the bi-gram "aa") of the one-skip vector 331, indicates that the one-skip bi-gram "aa"

occurs once in the set of characters 312. Similarly, in this implementation, the value of two in the field corresponding to the one-skip bi-gram "ej" indicates that the one-skip bi-gram "ej" occurs twice in the set of characters 312. As explained above, in other implementations, the vector generation instructions 114 generate Boolean vectors rather than vectors based on counts of each bi-gram.

Since the one-skip vector 331 and the zero-skip vector 321 are both based on bi-grams of the set of characters 312, the one-skip vector 331 and the zero-skip vector 321 have the same length. Thus, the length of the one-skip vector 331 is P×P, as explained above with reference to the zero-skip vector 321.

A third operation 340 of FIG. 4 illustrates forming a third vector (e.g., four-skip vector 341) based on four-skip bi-grams of the set of characters 312. Because the four-skip vector 341 is based on four-skip grams, each value of the four-skip vector 341 represents a non-adjacent group of characters (e.g., two characters with four character between them). Further, since the four-skip vector 341 is based on bi-grams, each non-adjacent group of characters includes two characters. Thus, each value of the four-skip vector 341 represents occurrence of a particular pair of characters separated in the set of characters 312 by four other character. Since the four-skip vector 341 is based on bi-grams, the four-skip vector 341 has the same length as the zero-skip vector 321 and the one-skip vector 331.

The vector generation instructions 114 may generate a single n-gram vector, such as the zero-skip vector 321 or may generate a set of n-gram vectors, such as the zero-skip vector 321, the one-skip vector 331, a two-skip vector (not shown), a three-skip vector (not shown), and the four-skip vector 341. Using multiple different skip grams (e.g., a zero-skip gram, a one-skip gram, a two-skip gram, a three-skip gram, and a four-skip gram) enable the vector generation instructions 114 to generate vectors that retain information about context of particular characters while constraining an overall size of the input data. For example, the length of each vector is fixed and known, as explained above. Thus, information about context of character pairs, such as presence of particular words or other patterns is retained without the use of a dictionary or other pattern information related to potential patterns within strings.

FIG. 5 illustrates a second particular example of operations performed by the feature extraction instructions 113 and the vector generation instructions 114. In particular, FIG. 5 illustrates generating entropy indicators as file features and generating one or more file vector based on n-grams of the entropy indicators. As explained with reference to FIGS. 1 and 2, the feature extraction instructions 125 and the vector generation instructions 126 may perform the same operations as the feature extraction instructions 113 and the vector generation instructions 114 on a file to be classified.

In FIG. 5, the feature extraction instructions 113 receive the binary file 310. The binary file 310 may include an executable file, such as one of the files 104 of FIGS. 1-3. The binary file 310 is divided into chunks via chunking instructions 401. For example, the binary file 310 may be divided into chunks of 256 bytes each. In other examples, different chunk sizes may be used. When the binary file 312 has a length that is not divisible by 256 bytes without a remainder, the remainder is maybe dropped. While the chunks 402 are illustrated in FIG. 5 in binary form, in other implementations, the chunking instructions 401 may convert the binary file 310 into hexadecimal values, and the chunks 402 may include hexadecimal values.

In a particular implementation, the feature extraction instructions 113 include entropy calculation instructions 403. The entropy calculation instructions 403 may be configured to calculate an entropy (e.g., a Shannon entropy) for each of the chunks 402. For example, in FIG. 5, the binary file 310 is used to generate five chunks 402 and the entropy calculation instructions 403 generate data including five of entropy values 404. Entropy values may be calculated using Equation 1:

$$H = -\Sigma_i P_i \log_2 P_i \quad \text{(Equation 1)}$$

where H is entropy, and $P_i$ is probability of each combination of values i. In a particular implementation, each byte of each of the chunks 402 is represented by a pair of hexadecimal characters. There are 256 possible values for a pair of hexadecimal characters. Thus, in this implementation, the entropy values (H) range between zero and eight where the maximum entropy (eight) is reached when $P_i$ takes a constant value of 1/256 (i.e., every byte is completely random). In other implementations, other ranges of entropy values may be used depending on the chunking, how data within each chunk is grouped (e.g., into two hexadecimal values in the example above), and the base of the logarithm that is used to calculate the entropy.

The entropy values 404 may be used to generate entropy indicators. For example, the entropy values 404 may be processed by the entropy indicator generation instructions 405 to generate the entropy indicators 410. In a particular implementation, the entropy indicator generation instructions 405 perform a binning operation to assign each of the entropy values 404 to an entropy range bin corresponding to an entropy indicator. For example, in FIG. 5, the range of possible entropy values (0-8) is divided into 8 bins, and each bin is associated with a bin name. The bin names are used as entropy indicators.

To illustrate, in the example illustrated in FIG. 5, the entropy values 404 include a first entropy value of 1.30. The first entropy value of 1.30 is within a range of entropy values 1-2 associated with the second bin, and the bin name of second bin is "b". Accordingly, an entropy indicator "b" is included as a first entry of entropy indicators 410. Similarly, the entropy values 404 include a second entropy value of 1.30, which is represented in a second entry of the entropy indicators 410 by an entropy indicatory "b". Likewise, the entropy values 404 include a third entropy value of 7.35, which is represented in a third entry of the entropy indicators 410 by an entropy indicatory "h".

The length (e.g., number of fields) of the entropy indicators 410 depends on the length of the file 310 (or how many chucks are generated based on the file 310). Accordingly, the entropy indicators 410 may have more or fewer values depending on the length of the binary file 310. Thus, although the entropy indicators 410 of FIG. 5 include six fields corresponding to entropy indicators "b," "b," "h," "d," "b," and "a" this is for ease of illustration, and is not a limitation. Rather, different files are likely to have different file lengths, and thus, to generate different numbers of entropy indicators 410.

The vector generation instructions 114 may use a process similar to the process described in FIG. 4 in order to generate a file vector (or file vectors) having a known length based on the entropy indicators 410. For example, FIG. 5 illustrates the vector generation instructions 114 performing an operation 420 to generate a zero-skip vector 421 (e.g., a vector indicating occurrences of zero-skip bi-grams in the entropy indicators 410). The zero-skip vector 421 is generated in FIG. 5 using the same process that was used to generate the zero-skip vector 321 in FIG. 4. Thus, the zero-skip vector 421 has a length corresponding to the number of bins used by the entropy indicator generation instructions 405 squared. In the particular example illustrated in FIG. 5, the entropy indicator generation instructions 405 use eight bin; therefore, the zero-skip vector 421 has a length of 64 fields or values. As explained with reference to FIG. 4, the zero-skip vector 421 may be a Boolean vector, or each field of the zero-skip vector 421 may represent a count. If the zero-skip vector 421 is a Boolean vector, each field of the zero-skip vector 421 a binary value indicating whether the particular combination of entropy indicators is present in the entropy indicators 410. Alternatively, each field of the zero-skip vector 421 may have a value representing a count of occurrences of groups of entropy indicators in the entropy indicator 410.

In FIG. 5, the zero-skip vector 421 is illustrated as a bi-gram; however, in other implementations, the zero-skip vector 421 may include a tri-gram, a four-gram or an n-gram with a different value of n. For example, if the zero-skip vector 421 includes a tri-gram, each field of the zero-skip vector 421 represents occurrence of a series of three entropy indicators in the entropy indicators 410. In this example, the zero-skip vector 421 would have a length corresponding to P×P×P, where P=8, or 512 fields.

Additionally, although FIG. 5 illustrates only the zero-skip vector 421, in other implementations, the vector generation instructions 114 may use the entropy indicators 410 to generate a one-skip vector, a two-skip vector, a three-skip vector, or a four-skip vector, as described with reference to FIG. 4. Further, although FIG. 5 only illustrates the vector generation instructions 114 generating a single vector (i.e., the zero-skip vector 421), in other implementations, the vector generation instructions 114 in FIG. 5 may generate a set of vectors, such as the zero-skip vector 421 (i.e., a zero-skip bi-gram vector), a one-skip bi-gram vector (such as the one-skip vector 331 of FIG. 3), a two-skip bi-gram vector, a three-skip bi-gram vector, and a four-skip bi-gram vector (such as the four-skip vector 341 of FIG. 4).

The vector or vectors generated in FIG. 5 represent entropy values of regions (e.g., blocks) of the file 310 and patterns of entropy values within the file 310. One advantage of representing entropy values via the vector is that patterns of entropy values may be retained from one generation or version of a malware code to a subsequent generation of version of the malware code. For example, one method of obscuring or hiding malware code from a signature-based malware detection program is to encrypt the malware code within the binary file. After the encrypted portion of the malware code has been identified using a signature-based recognition system, the malware code can be re-encrypted using a different encryption key. Re-encrypting using a different encryption key may change the malware code sufficiently to elude detection of the malware code by signature-based recognition system. However, re-encrypting the malware code using a different key does not change the distribution of entropy values within the file. Accordingly, using information about the pattern or distribution of entropy within the file may be able to detect the re-encrypted malware code that would not be detected by a signature-based malware detection application.

Figure 6:
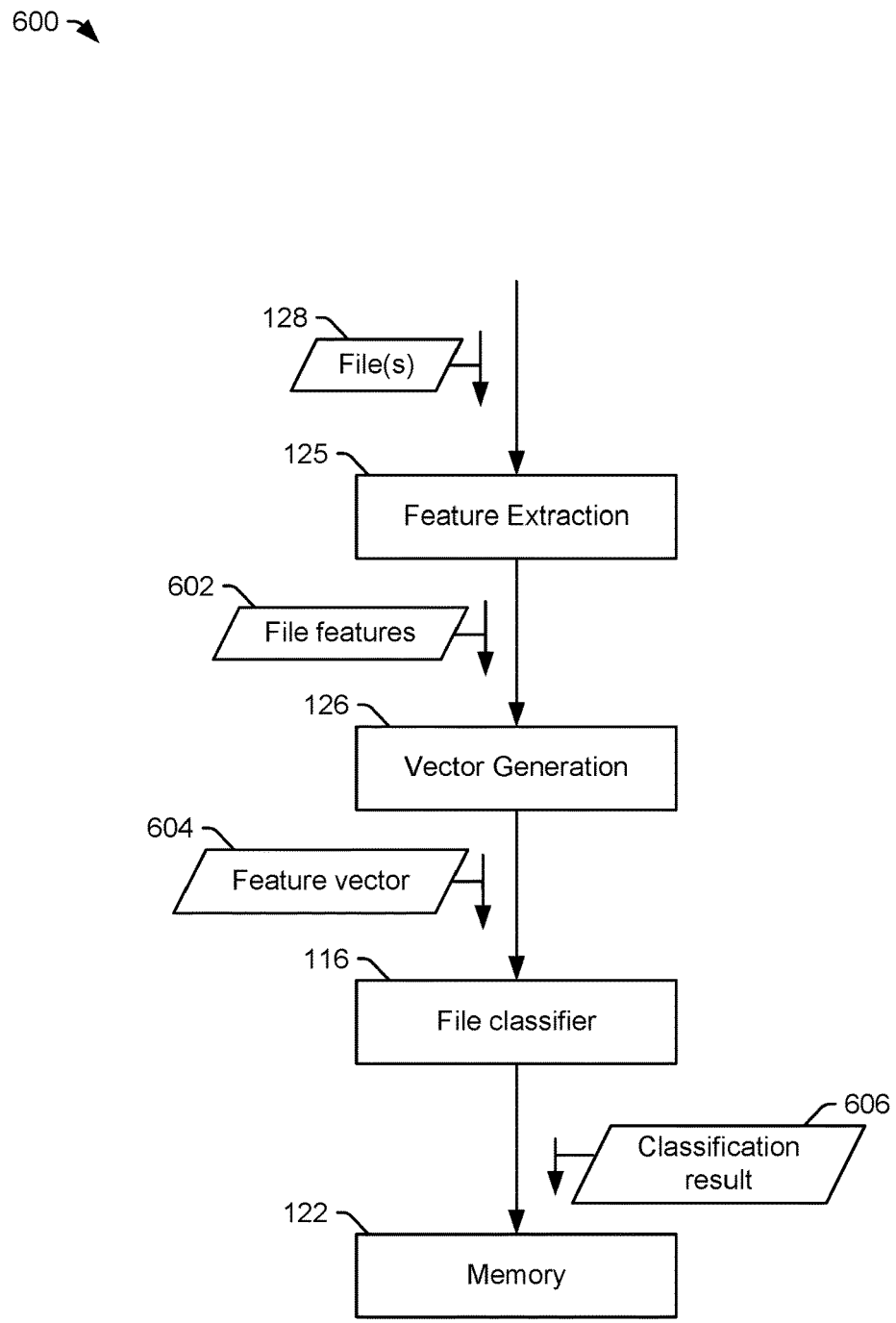
FIG. 6 illustrates a first example of a process of using a trained file classifier for malware detection.

FIG. 6 illustrates a first example of a process 600 of using the file classifier 116 for malware detection. In the example illustrated in FIG. 6, the file 128 is received at the second computing device 120 of FIG. 1, and the second computing device 120 executes the classification application 124 (based on the file classifier 116) to determine whether the file 128 includes malware.

In FIG. 6, the file 128 is provided to feature extraction instructions 125. The feature extraction instructions 125 are configured to extract file features 602 from the file 128. In a particular implementation, the feature extraction instructions 125 operate in the same manner as the feature extraction instructions 113 of FIGS. 1-5. For example, the file features 602 extracted from the file 128 by the feature extraction instructions 125 may include a set of characters (like the set of characters 312 of FIG. 4), may include entropy indicators (like the entropy indicators 410 of FIG. 5), or both.

The file features 602 may be provided to vector generation instructions 126. The vector generation instructions 126 operate in the same manner as the vector generation instructions 114 of FIGS. 1-5. For example, the vector generation instructions 126 may generate one or more feature vectors 604 based on the file features 602. The one or more feature vectors 604 may indicate occurrences of skip n-grams or zero-skip n-grams within the file features 602, as described with reference to FIGS. 1-5. For example, the one or more feature vectors 604 may include a vector representing presence of pairs of adjacent characters in a set of printable characters of the file features 602, may represent groups of entropy indicators in a set of entropy indicators of the file features 602, or both.

The one or more feature vectors 604 may be provided as input to the file classifier 116. As explained above, the file classifier 116 may include a deep neural network, a support vector machine, a decision tree, or another data structure generated to model the supervised training data 224 of FIG. 3. The file classifier 116 may generate data representing a classification result 606 for the file 128 based on the feature vector 604. For example, the classification result 606 may indicate whether or not the file 128 includes malware. Alternatively, the classification result 606 may indicate that the file 128 does not include malware, or that the file 128 includes a particular type of malware, such as a trojan, adware, or a worm. The classification result 606 may be stored in the memory 122 along with a file identifier (such as the file identifier 130 of FIG. 1) of the file 128. Alternatively, or in addition, the classification result 606 may be provided as an output to a user (e.g., via the display device 131 of FIG. 1) to indicate whether the file 128 is safe to use.

In a particular implementation, the classification result 606 and the file identifier 130 may be used as a white list or black list to check files received in the future. For example, when another file is received, a file identifier of the other file may be generated and checked against file identifiers in the memory 122 to determine whether the new file has been previously checked using the file classifier 116. In this example, one or more of the feature extraction instructions 125, the vector generation instructions 126, or the file classifier 116 may be executed based on determining that the file identifier of the new file does not match the identifier of a previously checked file.

Figure 7:
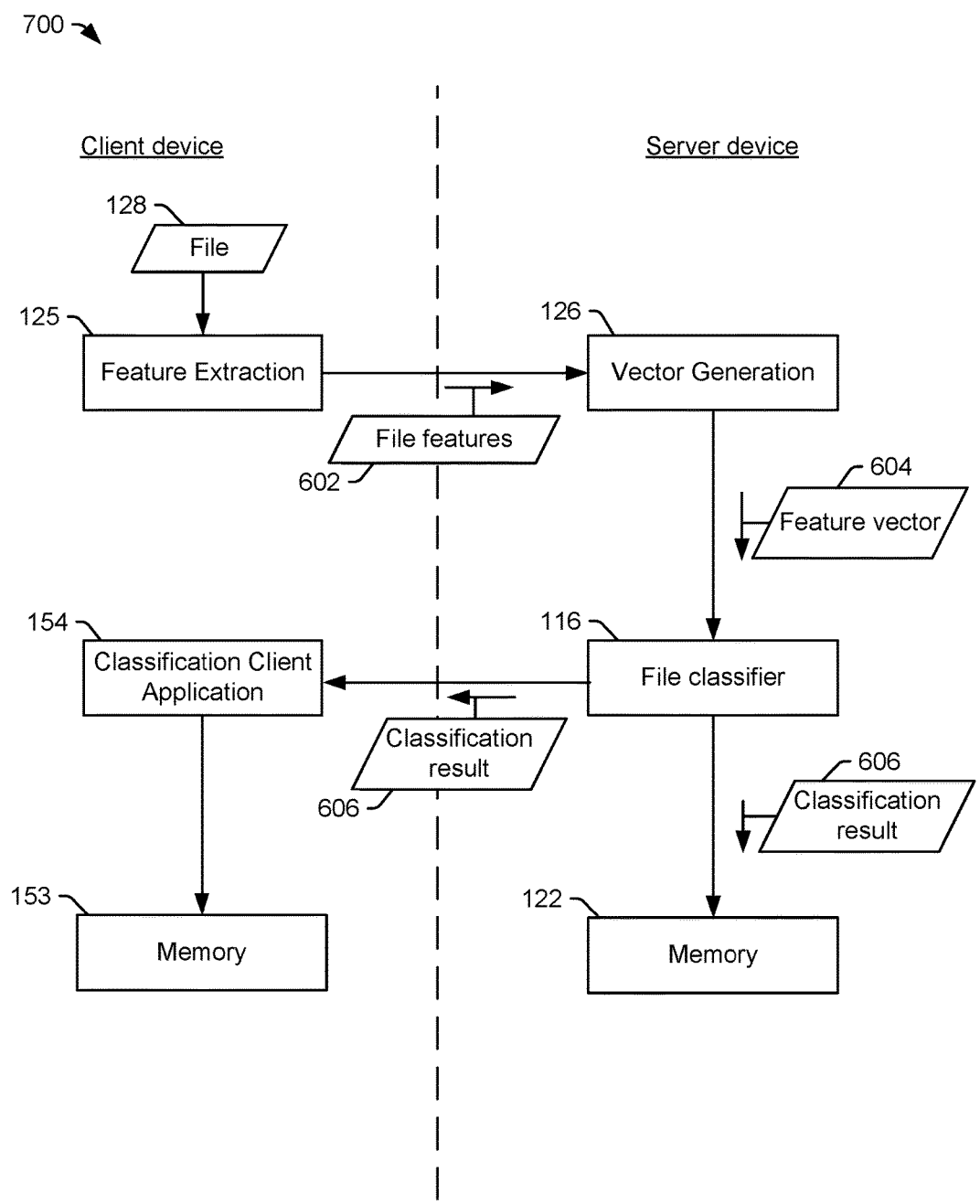
FIG. 7 illustrates a second example of a process of using a trained file classifier for malware detection.

FIG. 7 illustrates a second example of a process 700 of using the file classifier 116 for malware detection. In the example illustrated in FIG. 7, the file 128 is received at a client computing device (e.g., the third computing device 150 of FIG. 2), which sends file features to a server computing device (e.g., the second computing device 120), and the server computing device executes the classification application 124 (based on the file classifier 116) to determine whether the file 128 includes malware.

In FIG. 7, the file 128 is provided to the feature extraction instructions 125 of the client computing device. The feature extraction instructions 125 are configured to extract file features 602 from the file 128. In a particular implementation, the feature extraction instructions 125 operate in the same manner as the feature extraction instructions 113 of FIGS. 1-5. For example, the file features 602 extracted from the file 128 by the feature extraction instructions 125 may include a set of characters (like the set of characters 312 of FIG. 4), may include entropy indicators (like the entropy indicators 410 of FIG. 5), or both.

The client computing device sends the file features 602 to the server computing device. The server computing device generates a feature vector 604 or feature vectors based on the file features 602. In other implementations, the client computing device includes the vector generation instructions 126, and the file features 602 include or correspond to the feature vector 604. The vector generation instructions 126 operate in the same manner as the vector generation instructions 114 of FIGS. 1-5. For example, the feature vectors 604 may indicate occurrences of skip n-grams or zero-skip n-grams within the file features 602, as described with reference to FIGS. 1-5. As another example, the feature vectors 604 may include a vector representing presence of pairs of adjacent characters in a set of printable characters of the file features 602, may represent groups of entropy indicators in a set of entropy indicators of the file features 602, or both.

The one or more feature vectors 604 may be provided as input to the file classifier 116. As explained above, the file classifier 116 may include a deep neural network, a support vector machine, a decision tree, or another data structure generated to model the supervised training data 224 of FIG. 3. The file classifier 116 may generate data representing a classification result 606 for the file 128 based on the one or more feature vectors 604. For example, the classification result 606 may indicate whether or not the file 128 includes malware. Alternatively, the classification result 606 may indicate that the file 128 does not include malware, or that the file 128 includes a particular type of malware, such as a trojan, adware, or a worm. Data indicating the classification result 606 is sent to the client computing device. The classification result 606 may also be stored in the memory 122 along with a file identifier (such as the file identifier 130 of FIG. 1) of the file 128.

The classification client application 154 of the client computing device may generate an output (e.g., via the display device 131 of FIG. 1) to indicate whether the file 128 is safe to use. In some implementations, the classification client application 154 may quarantine or otherwise restrict access to or execution of the file 128 if the file 128 is determined to include malware.

Figure 8:
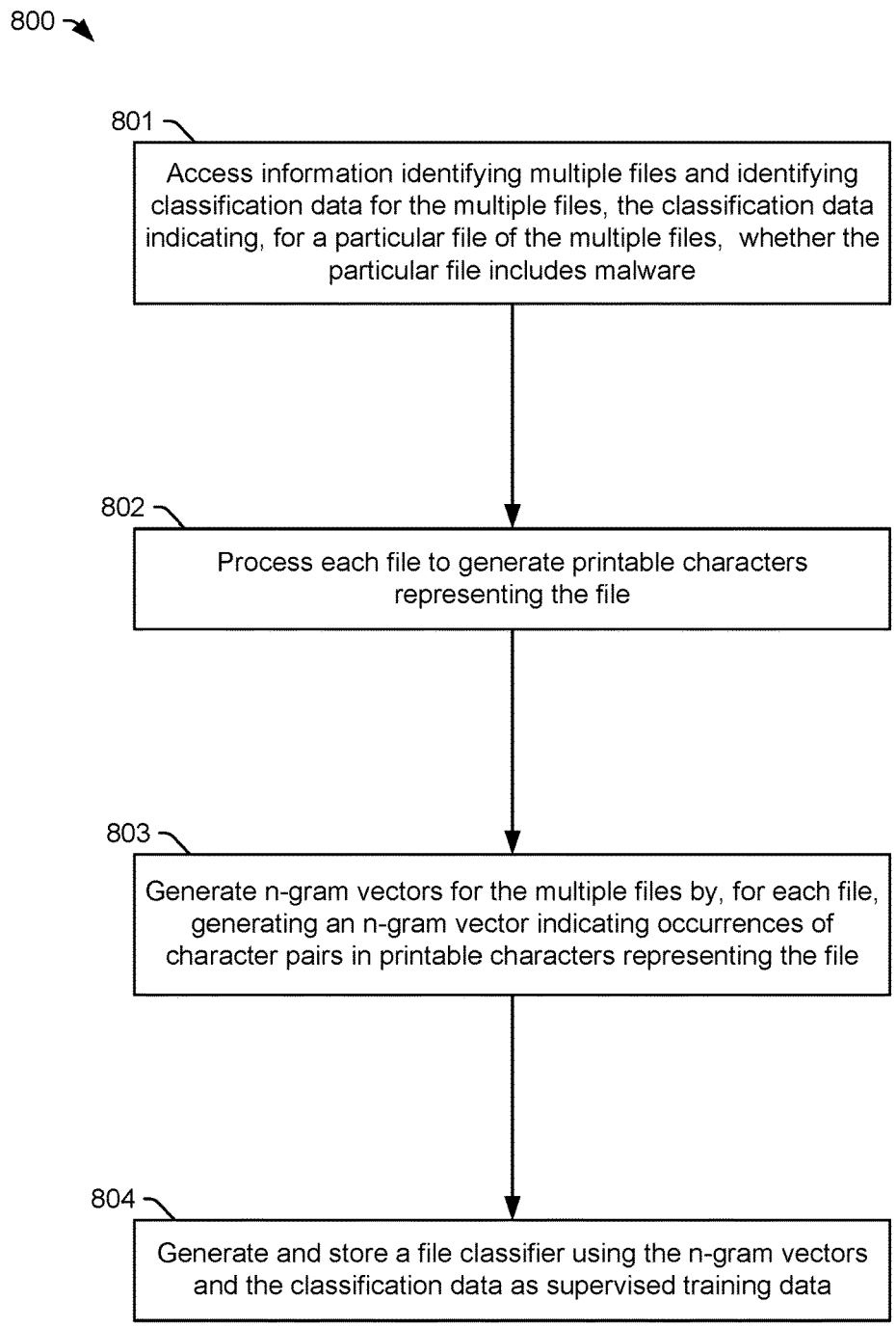
FIG. 8 is a flowchart illustrating a particular example of a method of generating a trained file classifier.

FIG. 8 is a flowchart illustrating a particular example of a method 800 of generating a file classifier. The method 800 may be performed by the first computing device 110 of FIGS. 1 and 2. For example, the processor 111 executing instructions from the memory 112 may perform the method 800.

The method 800 includes, at 801, accessing information identifying multiple files and identifying classification data for the multiple files, where the classification data indicates, for a particular file of the multiple files, whether the particular file includes malware. For example, the first computing device 110 of FIG. 1 may access the training data 102, which includes the files 104 and the classification data 103 associated with the files 104.

The method 800 includes, at 802, processing each file to generate printable characters representing the file. For example, the processor 111 executing the feature extraction instructions 113 may generate the printable characters. To illustrate, the feature extraction instructions 113 may include the string extraction instructions 311 that are configured to process binary files to generate ASCII characters.

The method 800 includes, at 803, generating n-gram vectors for the multiple files by, for each file, generating an n-gram vector indicating occurrences of character pairs in printable characters representing the file. For example, the processor 111 executing the vector generation instructions 114 may generate the n-gram vectors for the multiple files. The n-gram vectors may include skip vectors, no-skip vectors, or both. To illustrate, the n-gram vectors may include one or more of the zero-skip vector 321 of FIG. 4, the one-skip vector 331 of FIG. 4, a two-skip vector, a three-skip vector, the four-skip vector 341 of FIG. 4, or a vector that uses an n-gram with different skip value. Further, the n-gram vectors may include one or more of a bi-gram, a tri-gram, or a vector that uses a different value of n.

The method 800 includes, at 804, generating and storing a file classifier using the n-gram vectors and the classification data as supervised training data. For example, the processor 111 executing the classifier generation instructions 115 may generate the file classifier 116 using the n-gram vectors and the classification data 103 as supervised training data 224. The file classifier 116 may be stored in the memory 112, may be provided to the second computing device 120, or both.

Figure 9:
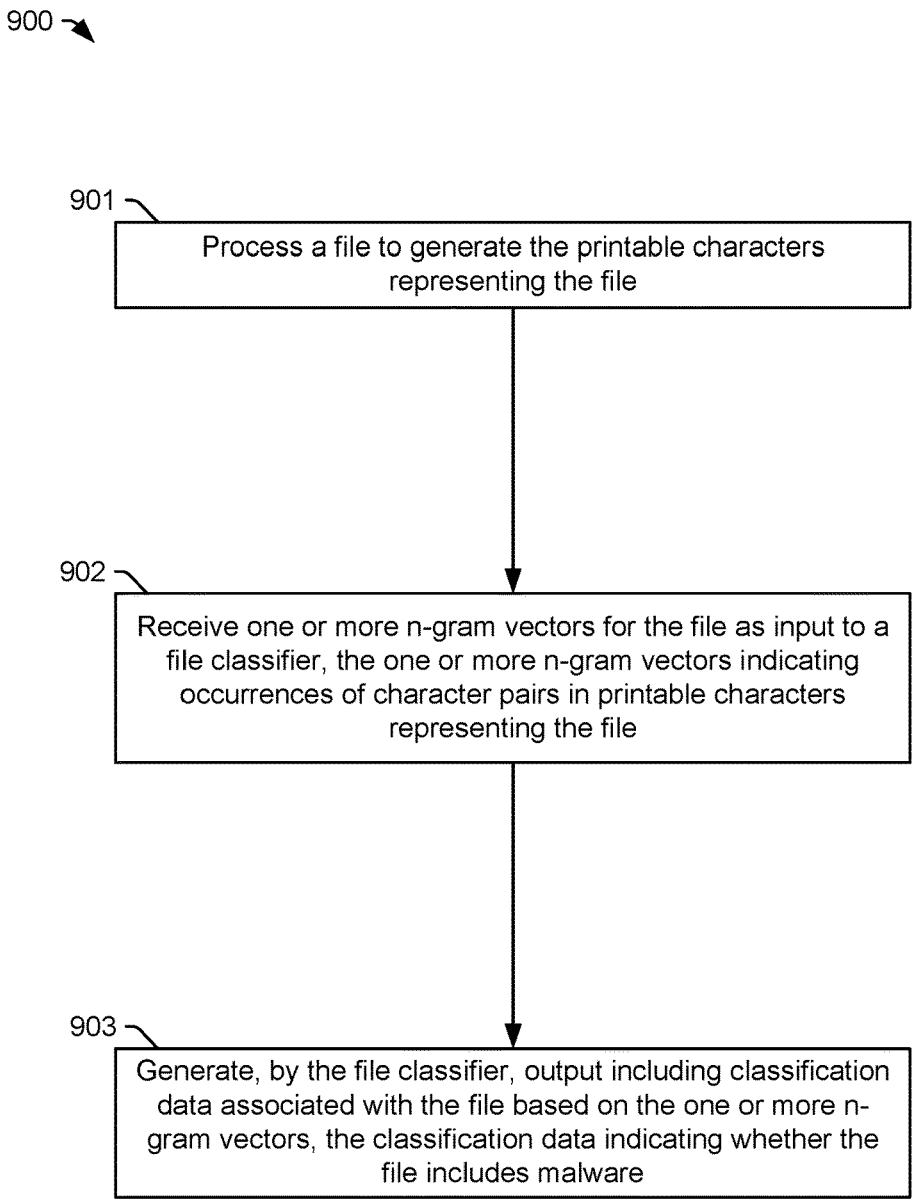
FIG. 9 is a flowchart illustrating a particular example of a method of using a trained file classifier.

FIG. 9 is a flowchart illustrating a particular example of a method 900 of using a file classifier. The method 900 may be performed by the second computing device 120 of FIG. 1. For example, the processor 121 executing the classification application 124 from the memory 122 may perform the method 900. In another implementation, the method 900 may be performed by the classification client application 154 in co-operation with the classification server application 170 of FIG. 2.

The method 900 includes, at 901, processing a file to generate the printable characters representing the file. For example, the processor 121 executing classification application 124 may generate the printable characters. To illustrate, the classification application 124 may include feature extraction instructions (such as the feature extraction instructions 113 or the string extraction instructions 311) that are configured to process binary files to generate the printable characters.

The method 900 includes, at 902, receiving one or more n-gram vectors for the file as input to a file classifier, where the one or more n-gram vectors indicates occurrences of character pairs in the printable characters representing the file. For example, the processor 121 executing the classification application 124 may receive one or more n-gram vectors for the file as input to the file classifier 116. In this example, the classification application 124 may include vector generation instructions (such as the vector generation instructions 114) that are configured to generate the n-gram vectors for the multiple files and to provide the n-gram vectors as input to the file classifier 116.

The method 900 includes, at 903, generating, by the file classifier, output including classification data associated with the file based on the one or more n-gram vectors, where the classification data indicate whether the file includes malware. For example, the processor 121 executing the classification application 124 may generate output including a classification result associated with the file 128.

Figure 10:
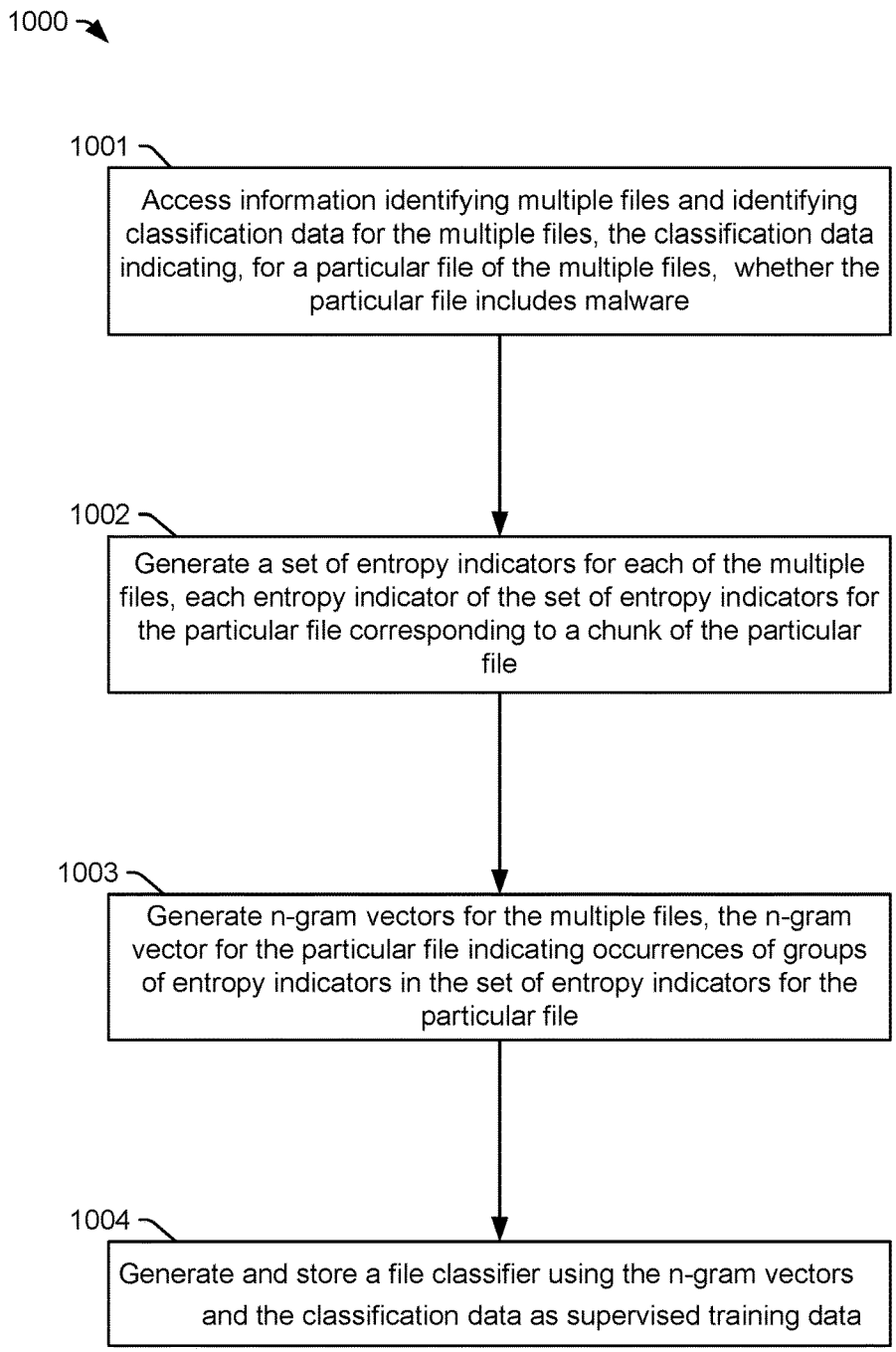
FIG. 10 is a flowchart illustrating another particular example of a method of generating a trained file classifier.

FIG. 10 is a flowchart illustrating another particular example of a method 1000 of generating a file classifier. The method 1000 may be performed by the first computing device 110 of FIG. 1. For example, the processor 111 executing instructions from the memory 112 may perform the method 1000.

The method 1000 includes, at 1001, accessing information identifying multiple files and identifying classification data for the multiple files, where the classification data indicate, for a particular file of the multiple files, whether the particular file includes malware. For example, the first computing device 110 of FIG. 1 may access the training data 102, which includes the files 104 and the classification data 103 associated with the files 104.

The method 1000 includes, at 1002, generating a set of entropy indicators for each of the multiple files, each entropy indicator of the set of entropy indicators for the particular file corresponding to a chunk of the particular file. For example, the processor 111 executing the feature extraction instructions 113 may generate the sequence of entropy indicators. To illustrate, the feature extraction instructions 113 may include the chunking instructions 401 that parse each file to generate chucks (such as the chunks 402) based on each file. The feature extraction instructions 113 may also include the entropy calculation instructions 403 that are configured to determine an entropy value for each chuck. The feature extraction instructions 113 may further include the entropy indicator generation instructions 405 that are configured to determine an entropy indicator for each entropy value to generate the entropy indicators 410.

The method 1000 includes, at 1003, generating n-gram vectors for the multiple files, where the n-gram vector for the particular file indicates occurrences of groups of entropy indicators in the sequence of entropy indicators for the particular file. For example, the processor 111 executing the vector generation instructions 114 may generate the n-gram vectors for the multiple files. The n-gram vectors may include skip vectors, no-skip vectors, or both. To illustrate, the n-gram vectors may include one or more of the zero-skip vector 421 of FIG. 5, a one-skip vector, a two-skip vector, a three-skip vector, a four-skip vector, or a vector that uses an n-gram with different skip value. Further, the n-gram vectors may include one or more of a bi-gram, a tri-gram, or a vector that uses a different value of n.

The method 1000 includes, at 1004, generating and storing a file classifier using the n-gram vectors and the classification data as supervised training data. For example, the processor 111 executing the classifier generation instructions 115 may generate the file classifier 116 using the n-gram vectors and the classification data 103 as supervised training data 224. The file classifier 116 may be stored in the memory 112, may be provided to the second computing device 120, or both.

FIG. 11 is a flowchart illustrating another particular example of a method 1100 of using a file classifier. The method 1100 may be performed by the second computing device 120 of FIG. 1. For example, the processor 121 executing the classification application 124 from the memory 122 may perform the method 1100. In another implementation, the method 900 may be performed by the classification client application 154 in co-operation with the classification server application 170 of FIG. 2.

The method 1100 includes, at 1101, receiving one or more n-gram vectors for a file as input to a file classifier, where the one or more n-gram vectors indicates occurrences of groups of entropy indicators in a sequence of entropy indicators representing the file. For example, the processor 121 executing the classification application 124 may generate entropy indicators representing the file 128. To illustrate, the classification application 124 may include feature extraction instructions (such as the feature extraction instructions 113, the chunking instructions 401, the entropy calculation instructions 403, the entropy indicator generation instructions 405, or a combination thereof) that are configured to process binary files to generate the entropy indicators 410. Further, the classification application 124 may include vector generation instructions (such as the vector generation instructions 114) that are configured to generate the n-gram vectors for the multiple files and to provide the n-gram vectors as input to the file classifier 116.

The method 1100 includes, at 1102, generating, based on the one or more n-gram vectors, output including classification data associated with the file, where the classification data indicate whether the file includes malware. For example, the processor 121 executing the classification application 124 may generate output including the classification result associated with the file 128.

The systems and methods illustrated herein may be described in terms of functional block components, screen shots, optional selections and various processing steps. It should be appreciated that such functional blocks may be realized by any number of hardware and/or software components configured to perform the specified functions. For example, a system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. A computer-readable storage medium or device is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Methods disclose herein may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computing device comprising:
   a memory configured to store instructions to generate a file classifier; and
   a processor configured to execute the instructions from the memory to perform operations comprising:
      accessing information identifying multiple files and identifying classification data for the multiple files, wherein the classification data indicates, for a particular file of the multiple files, whether the particular file includes malware;
      generating a sequence of entropy indicators for each of the multiple files, each entropy indicator of the sequence of entropy indicators for the particular file corresponding to a chunk of the particular file;
      generating n-gram vectors for the multiple files, wherein an n-gram vector for the particular file indicates occurrences of groups of entropy indicators in the sequence of entropy indicators for the particular file; and
      generating and storing a file classifier using the n-gram vectors and the classification data as supervised training data, wherein the supervised training data includes a plurality of n-gram vectors for each file, the plurality of n-gram vectors for at least one file including a zero-skip n-gram vector indicating occurrences of groups of adjacent entropy indicators, and including at least one skip n-gram vector indicating occurrences of groups of non-adjacent entropy indicators.

2. The computing device of claim 1, wherein the n-gram vectors include a Boolean vector indicating the occurrences of the groups of entropy indicators.

3. The computing device of claim 1, wherein the n-gram vectors include a count of the occurrences of the groups of entropy indicators.

4. The computing device of claim 1, wherein each group of entropy indicators of the groups of entropy indicators includes two or more entropy indicators.

5. The computing device of claim 1, wherein the file classifier corresponds to a decision tree, a neural network, or a support vector machine.

6. The computing device of claim 1, wherein the operations further comprise generating printable characters corresponding to each of the multiple files, and wherein the file classifier is generated further based on the printable characters.

7. A method comprising:
   accessing information identifying multiple files and identifying classification data for the multiple files, wherein the classification data indicates, for a particular file of the multiple files, whether the particular file includes malware;
   generating a sequence of entropy indicators for each of the multiple files, each entropy indicator of the sequence of entropy indicators for the particular file corresponding to a chunk of the particular file;
   generating n-gram vectors for the multiple files, where an n-gram vector for the particular file indicates occurrences of groups of entropy indicators in the sequence of entropy indicators for the particular file; and
   generating and storing a file classifier using the n-gram vectors and the classification data as supervised training data, wherein the supervised training data includes a plurality of n-gram vectors for each file, the plurality of n-gram vectors for at least one file including a zero-skip n-gram vector indicating occurrences of groups of adjacent entropy indicators, and including at least one skip n-gram vector indicating occurrences of groups of non-adjacent entropy indicators.

8. The method of claim 7, wherein the multiple files include files with malware, files without malware, and corresponding classification data.

9. The method of claim 7, wherein the n-gram vectors include a Boolean vector indicating the occurrences of the groups of entropy indicators.

10. The method of claim 7, wherein the n-gram vector includes a count of the occurrences of the groups of entropy indicators.

11. The method of claim 7, wherein a group of entropy indicators of the groups of entropy indicators corresponds to two adjacent entropy indicators.

12. The method of claim 7, further comprising generating printable characters corresponding to each of the multiple files, and wherein the file classifier is generated further based on the printable characters.

13. The method of claim 7, wherein generating the n-gram vectors includes generating, for each file, a plurality of n-gram vectors, the plurality of n-gram vectors for each file including a zero-skip n-gram vector indicating the occurrences of the groups of adjacent entropy indicators and including multiple n-gram vectors indicating occurrences of pairs of printable characters.

14. A computer-readable storage device storing instructions that, when executed, cause a computer to perform operations comprising:
   accessing information identifying multiple files and identifying classification data for the multiple files, wherein the classification data indicates, for a particular file of the multiple files, whether the particular file includes malware;
   generating a sequence of entropy indicators for each of the multiple files, each entropy indicator of the sequence of entropy indicators for the particular file corresponding to a chunk of the particular file;
   generating n-gram vectors for the multiple files, wherein an n-gram vector for the particular file indicates occurrences of groups of entropy indicators in the sequence of entropy indicators for the particular file; and
   generating and storing a file classifier using the n-gram vectors and the classification data as supervised training data, wherein the supervised training data includes a plurality of n-gram vectors for each file, the plurality of n-gram vectors for at least one file including a zero-skip n-gram vector indicating occurrences of groups of adjacent entropy indicators, and including at least one skip n-gram vector indicating occurrences of groups of non-adjacent entropy indicators.

15. The computer-readable storage device of claim 14, wherein the multiple files include files with malware, files without malware, and corresponding classification data.

16. The computer-readable storage device of claim 14, wherein the operations further comprise generating a plurality of printable characters representing the file, and wherein generating the n-gram vectors includes generating, for at least one file, an n-gram vector indicating occurrences of pairs of printable characters.

17. The computer-readable storage device of claim 16, wherein generating the plurality of printable characters representing the file includes converting at least a portion of the file to American Standard Code for Information Interchange (ASCII) characters.

18. The computer-readable storage device of claim 14, wherein the supervised training data includes the plurality of n-gram vectors for each file.

19. The computer-readable storage device of claim 18, further including multiple n-gram vectors indicating occurrences of pairs of printable characters.

\* \* \* \* \*